United States Patent
Fukui et al.

(10) Patent No.: US 9,406,930 B2
(45) Date of Patent: Aug. 2, 2016

(54) NICKEL COMPOSITE HYDROXIDE AND PRODUCTION METHOD THEREOF, CATHODE ACTIVE MATERIAL FOR NON-AQUEOUS ELECTROLYTE SECONDARY BATTERY AND PRODUCTION METHOD THEREOF, AND NONAQUEOUS ELECTROLYTE SECONDARY BATTERY

(71) Applicant: SUMITOMO METAL MINING CO., LTD., Tokyo (JP)

(72) Inventors: Atsushi Fukui, Ehime (JP); Hiroyuki Toya, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 92 days.

(21) Appl. No.: 14/366,871

(22) PCT Filed: Dec. 20, 2012

(86) PCT No.: PCT/JP2012/083128
§ 371 (c)(1),
(2) Date: Jun. 19, 2014

(87) PCT Pub. No.: WO2013/094701
PCT Pub. Date: Jun. 27, 2013

(65) Prior Publication Data
US 2014/0377660 A1  Dec. 25, 2014

(30) Foreign Application Priority Data

Dec. 20, 2011 (JP) .................................. 2011-278955
Dec. 19, 2012 (JP) .................................. 2012-277430

(51) Int. Cl.
*H01M 4/00* (2006.01)
*H01M 4/36* (2006.01)
(Continued)

(52) U.S. Cl.
CPC ............ *H01M 4/364* (2013.01); *C01G 53/006* (2013.01); *C01G 53/42* (2013.01); *C01G 53/44* (2013.01);
(Continued)

(58) Field of Classification Search
CPC . H01M 4/364; H01M 4/0471; H01M 4/0497; H01M 4/1391; H01M 4/505; H01M 4/525; H01M 10/0525; C01G 53/006; C01G 53/42; C01G 53/44; C01G 53/50; Y02P 70/54
See application file for complete search history.

(56) References Cited

U.S. PATENT DOCUMENTS 7,410,511 B2  8/2008 Ozaki et al.
2006/0263691 A1*  11/2006 Park .................... H01M 4/131
429/231.95
(Continued)

FOREIGN PATENT DOCUMENTS

CN  100466341 C  3/2009
EP  2720305 A1  4/2014
(Continued)

OTHER PUBLICATIONS

Notice of Reasons for Rejection dated Dec. 1, 2015, from the corresponding JP2012277430.
(Continued)

*Primary Examiner* — Raymond Alejandro
(74) *Attorney, Agent, or Firm* — Katten Muchin Rosenman LLP

(57) ABSTRACT

Provided is a lithium composite oxide having a uniform and suitable particle size and high specific surface area due to a hollow structure that can be produced on an industrial scale. A nickel composite hydroxide as a raw material thereof is obtained controlling the particle size distribution of the nickel composite hydroxide, the nickel composite hydroxide having a structure comprising a center section that comprises minute primary particles, and an outer-shell section that exists on the outside of the center section and comprises plate shaped primary particles that are larger than the primary particles of the center section, by a nucleation process and a particle growth process that are separated by controlling the pH during crystallization, and by controlling the reaction atmosphere in each process and the manganese content in a metal compound that is supplied in each process.

17 Claims, 6 Drawing Sheets

(51) Int. Cl.
  *H01M 4/505* (2010.01)
  *H01M 4/525* (2010.01)
  *C01G 53/00* (2006.01)
  *H01M 4/04* (2006.01)
  *H01M 4/1391* (2010.01)
  *H01M 10/0525* (2010.01)

(52) U.S. Cl.
  CPC ............ *C01G 53/50* (2013.01); *H01M 4/0471* (2013.01); *H01M 4/0497* (2013.01); *H01M 4/1391* (2013.01); *H01M 4/505* (2013.01); *H01M 4/525* (2013.01); *H01M 10/0525* (2013.01); *C01P 2004/32* (2013.01); *C01P 2004/45* (2013.01); *C01P 2004/51* (2013.01); *C01P 2004/61* (2013.01); *C01P 2004/84* (2013.01); *C01P 2006/12* (2013.01); *Y02E 60/122* (2013.01); *Y02P 70/54* (2015.11)

(56) References Cited

U.S. PATENT DOCUMENTS

| | | | |
|---|---|---|---|
| 2007/0292763 A1* | 12/2007 | Park | C01G 45/006 429/231.1 |
| 2010/0099027 A1 | 4/2010 | Kikuya et al. | |
| 2012/0074351 A1* | 3/2012 | Levasseur | H01M 4/1391 252/182.1 |
| 2012/0134914 A1* | 5/2012 | Paulsen | H01B 1/08 423/594.15 |
| 2012/0280171 A1* | 11/2012 | Belharouak | H01M 4/485 252/182.1 |
| 2012/0282525 A1 | 11/2012 | Nagai et al. | |

FOREIGN PATENT DOCUMENTS

| | | |
|---|---|---|
| JP | 10-029820 A | 2/1998 |
| JP | 10-310433 A | 11/1998 |
| JP | 2004-193115 A | 7/2004 |
| JP | 2004-253174 A | 9/2004 |
| JP | 2006-228604 A | 8/2006 |
| JP | 2008-147068 A | 6/2008 |
| JP | 2009-117369 A | 5/2009 |
| JP | 2011-119092 A | 6/2011 |
| WO | 2011/067935 A1 | 6/2011 |
| WO | 2011/067982 A1 | 6/2011 |
| WO | 2012169274 A1 | 12/2012 |

OTHER PUBLICATIONS

Supplemental European Search Report dated Jul. 30, 2015, from the corresponding EP Application No. 12860901.3.
Office Action dated Jun. 11, 2015, from the corresponding Chinese Application No. 201280070138.8.
M-H Lee, et al., Synthetic optimization of Li[Ni1/3Co1/3Mn1/3]O2 via co-precipitation, Electrochimica Acta 50 (2004), pp. 939-948.
International Search Report dated Apr. 2, 2013, from the corresponding PCT/JP2012/083128.

* cited by examiner

US 9,406,930 B2

NICKEL COMPOSITE HYDROXIDE AND PRODUCTION METHOD THEREOF, CATHODE ACTIVE MATERIAL FOR NON-AQUEOUS ELECTROLYTE SECONDARY BATTERY AND PRODUCTION METHOD THEREOF, AND NONAQUEOUS ELECTROLYTE SECONDARY BATTERY

TECHNICAL FIELD

The present invention relates to a nickel composite hydroxide and production method thereof, a cathode active material for a non-aqueous electrolyte secondary battery and production method thereof, and a non-aqueous electrolyte secondary battery that uses this cathode active material for a non-aqueous electrolyte as the cathode material.

BACKGROUND ART

In recent years, as portable electronic devices such as mobile telephones, notebook personal computers and the like have spread, there is a large need for development of compact and lightweight secondary batteries having high energy density. There is also a large need for development of high-output secondary batteries as the batteries of electric automobiles, such as hybrid automobiles. As a kind of non-aqueous electrolyte secondary battery that satisfies such a need is a lithium-ion secondary battery. A lithium-ion secondary battery comprises an anode, a cathode and an electrolyte; and as the active material of the anode and cathode, a material from which lithium can be removed or inserted is used.

Currently, research and development of this kind of lithium-ion secondary battery is actively being carried out, however, of this research and development, in order to obtain 4V class voltage battery having high energy density, implementation of a lithium-ion secondary battery that uses a lithium composite oxide having layered structure or spinel structure as the cathode active material is advancing.

Currently, as the lithium composite oxide that is used as the cathode active material of a lithium-ion secondary battery, lithium cobalt composite oxide ($LiCoO_2$) capable of being synthesized with relatively ease, lithium nickel composite oxide ($LiNiO_2$) that uses nickel that is less expensive than cobalt, lithium nickel cobalt manganese composite oxide ($LiNi_{1/3}Co_{1/3}Mn_{1/3}O_2$), lithium manganese composite oxide ($LiMn_2O_4$) that uses manganese, and the like have been proposed.

In order to produce a battery having excellent performance such as a high cycling characteristic, low resistance and high output, it is necessary that the cathode active material be made up of particles having a uniform and suitable particle size. This is because, when cathode active material having a large particle size is used, it is not possible to sufficiently maintain surface area for reacting with the electrolyte, and there is a possibility that the reaction resistance of the cathode will increase and that it will not be possible to obtain a high-output battery; however, when a cathode active material having a very small particle size is used, the packing density of the cathode decreases, and there is a possibility that battery capacity per volume will decrease. On the other hand, when a cathode active material having a wide particle size distribution is used, the voltage that is applied to the particles of the cathode active material inside the cathode is not uniform due to the differences in particle size, and there is a possibility that problems will occur such as a selective deterioration of minute particles due to repeated discharging and charging, a decrease in battery capacity and an increase in reaction resistance of the cathode.

Moreover, in order to achieve a battery with higher output, shortening the distance that lithium ions move between the cathode and the anode is effective, so making the cathode plate thin is preferable. From this aspect, using a cathode active material having a small particle size within a range in which the voltage capacity per volume does not decrease is useful.

From the aspect of further increasing the output of the battery, not only is it necessary to use a cathode active material having a uniform and suitable particle size, but it is also necessary to use a cathode active material having a high specific surface area. For example, it is possible to increase the specific surface area by lowering the smoothness of the particle surface of the cathode active material, or by using particles having a porous structure, even when the particle size of the particles is kept the same. In that case, the reaction surface area of the particles and electrolyte becomes large, and it becomes possible to increase the reactivity of each, so it becomes possible to further improve the output of the battery.

In order to improve the performance of the lithium-ion secondary battery in this way, it is necessary to produce a lithium composite oxide as the cathode active material so as to have a uniform and suitable particle size, and so that the particles have a large specific surface area.

JP2008-147068 (A) discloses a lithium composite oxide of which in the particle size distribution curve, the particles have an average particle size D50, which means the particle size having a cumulative frequency of 50%, of 3 μm to 15 μm, and a particles size distribution having a minimum particle size of 0.5 μm or greater and a maximum particle size of 50 μm or less, in the relationships with the cumulative frequencies of 10%, D10, and 90%, D90, D10/D50 is 0.60 to 0.90, and D10/D90 is 0.30 to 0.70. This lithium composite oxide has a high packing characteristic, good discharging and charging capacity characteristic, and a high output characteristic, and deterioration is difficult even under conditions of a large discharging and charging load, and by using this lithium composite oxide as a cathode active material, it is possible to obtain a lithium-ion secondary battery having an excellent output characteristic and little deterioration of the cycling characteristic.

JP2004-253174 (A) discloses a lithium composite oxide that has a layered structure that comprises hollow particles having an outer shell on the outside and a hollow section inside this outer shell. Cathode active material comprising this kind of lithium composite oxide has an excellent cycling characteristic, output characteristic, heat stability and the like, and can be suitably used in a lithium-ion secondary battery.

However, even though the lithium composite oxide that is disclosed in JP2008-147068 (A) has an average particle size of 3 μm to 15 μm, the minimum particle size is 0.5 μm or greater and the maximum particle size is 50 μm or less, so there is a mixture of minute particles and rough particles, and from the values of D10/D50 and D10/D90 above, a narrow particle size distribution range is not possible. In other words, the lithium composite oxide disclosed in this literature cannot be said to have particles having a uniform particle size, so even when this lithium composite oxide is used as a cathode active material, it is difficult to improve the performance of the lithium-ion secondary battery.

Moreover, the lithium composite oxide that is disclosed in JP2004-253174 (A) has hollow particles, so the specific surface area is expected to be greater than solid particles, and it is thought to be possible to improve the reactivity of the particles and electrolyte due to the increased specific surface area. However, this literature says nothing about the particle size and particle size distribution of the lithium composite oxide. Therefore, it can be considered that this lithium composite oxide does not take into consideration the particle size and particle size distribution, so there is a possibility that selective deterioration of particles due to non uniform voltage being applied inside the electrodes caused by a non uniformity of particle sizes will occur, and that a decrease in battery capacity is not avoidable.

RELATED LITERATURE

Patent Literature

[Patent Literature 1] JP2008-147068 (A)
[Patent Literature 2] JP2004-253174 (A)

SUMMARY OF INVENTION

Problem to be Solved by Invention

As described above, a lithium complex oxide that makes it possible to sufficiently improve the performance of a lithium-ion secondary battery has not yet been developed. Moreover, various production methods for producing a composite hydroxide as the raw material for a lithium composite oxide are being investigated, however, a predominant production method that would make it possible to produce a composite hydroxide on an industrial scale related to the development of a lithium composite oxide that would bring about excellent battery performance also has not yet been proposed. Therefore, there is a need to develop a cathode active material comprising a lithium composite oxide having a uniform and suitable particle size and a large reaction surface area, for example, a hollow structure, a composite hydroxide as the raw material of the lithium composite oxide, and an industrial production method for producing these.

Taking such problems into consideration, the object of the present invention is to obtain a lithium composite oxide having a uniform and suitable particle size and a high specific surface area by using a hollow structure, and to be able to produce on an industrial scale a composite hydroxide as the raw material of the lithium composite oxide.

Moreover, another object of the present invention is to provide a cathode active material for a non-aqueous secondary battery that comprises a lithium composite oxide that makes it possible to suppress a decrease in battery capacity and makes it possible reduce the reaction resistance of the cathode in a lithium-ion secondary battery, as well as to provide a non-aqueous electrolyte secondary battery by using this kind of cathode active material that has high capacity, an excellent cycling characteristic and high output.

Means for Solving Problems

The inventors of the present invention diligently investigated a lithium nickel composite oxide that was able to display excellent battery characteristics when used as the cathode active material for a lithium-ion secondary battery, and as a result of that investigation, gained knowledge that, by controlling the particle size distribution of a nickel composite hydroxide as a raw material, and forming a structure having a center section comprising minute primary particles of nickel composite hydroxide, and an outer-shell section that exists around the outside of that center section and comprising plate shaped primary particles that are larger than the primary particles of the center section, a cathode active material for a non-aqueous electrolyte secondary battery comprising a lithium nickel composite oxide having a uniform and suitable particle size and having a hollow structure could be obtained. Moreover, knowledge was also obtained that this nickel composite hydroxide could be obtained by separating the crystallization process into a nucleation process and a particle growth process by controlling the pH value during crystallization, and by controlling the reaction atmosphere in each process and the metal compounds supplied in each process, or more specifically, by controlling the manganese content in a mixed aqueous solution as the supply source of the metal elements of the nickel composite hydroxide. The present invention was achieved based on this gained technical knowledge.

In other words, a first embodiment of the present invention relates to a production method for producing by a crystallization reaction nickel composite hydroxide that is expressed by a general formula (1): $Ni_xCo_yAl_zMn_tM_s(OH)_{2+a}$ ($x+y+z+t+s=1$, $0 \leq y \leq 0.3$, $0 < z \leq 0.1$, $0.001 < t \leq 0.05$, $0 \leq s \leq 0.05$, $0 \leq a \leq 0.5$, and M is at least one additional element that is selected from the group comprising Mg, Ca, Ti, V, Cr, Zr, Nb, Mo and W).

Particularly, the production method of the present invention comprises:

a nucleation process controlling a nucleation aqueous solution that includes a metal compound that includes metal elements at a composition ratio that is expressed by a general formula (a): $Ni_xCo_yAl_zMn_tM_s$ ($x+y+z+t+s=1$, $0 \leq y \leq 0.8$, $0 \leq z \leq 0.1$, $0.1 \leq t \leq 0.8$, $0 \leq s \leq 0.05$, and M is at least one additional element that is selected from the group comprising Mg, Ca, Ti, V, Cr, Zr, Nb, Mo and W) and an ammonium ion donor so that the pH value at a reference liquid temperature of 25° C. becomes 12.0 to 14.0, and performing nucleation with supplying the metal compound and the ammonium ion donor in an oxidizing atmosphere having an oxygen concentration greater than 1% by volume; and a particle growth process of controlling a particle growth aqueous solution that includes nuclei that were formed in the nucleation process so that the pH value at a reference liquid temperature of 25° C. becomes 10.5 to 12.0, and growing the nuclei with supplying the metal compound and the ammonium ion donor, and, at a time from the start of the particle growth process within a range of 1% to 15% of the total time from the start to end of the particle growth process, switching from the oxidizing atmosphere to a mixed atmosphere of oxygen and inert gas having an oxygen concentration of 1% by volume or less and replacing the supplied metal compound with a metal compound that includes metal elements at a composition ratio that is expressed by a general formula (b): $Ni_xCo_yAl_zMn_tM_s$ ($x+y+z+t+s=1$, $0 \leq y \leq 0.3$, $0 \leq z \leq 0.1$, $0 \leq t < 0.05$, $0 \leq s \leq 0.05$, and M is at least one additional element that is selected from the group comprising Mg, Ca, Ti, V, Cr, Zr, Nb, Mo and W), and continuing to grow the nuclei with supplying the metal compound and the ammonium ion donor;

and further comprising a process of coating an aluminum compound on the nickel composite hydroxide that is obtained in the particle growth process, at least in case that aluminum is not included in any of the metal compound that is included in the nucleation aqueous solution and the metal compound that is supplied in the particle growth process.

Preferably, the oxygen concentration of the oxidizing atmosphere is 10% by volume or greater.

Preferably, switching the atmosphere and the supplied metal compound in the particle growth process is performed in the range of 2% to 12.5% from the start of the particle growth process.

Preferably, an aqueous solution that is formed by adjusting the pH value of the nucleation aqueous solution after the nucleation process has ended is used as the particle growth aqueous solution.

Preferably, the oxygen concentration of the mixed atmosphere is 0.5% by volume or less.

Preferably, in the particle growth process, part of the liquid component of the particle growth aqueous solution is removed.

Moreover, preferably, in the nucleation process and in the particle growth process, the ammonia concentration of the nucleation aqueous solution and the particle growth aqueous solution is maintained within the range of 3 g/L to 25 g/L.

Furthermore, preferably, a process of coating a compound of the one kind of additional element or more on the nickel composite hydroxide that was obtained in the particle growth process is included. This process can be performed simultaneously with the process of coating the aluminum compound.

A second embodiment of the present invention relates to a nickel composite hydroxide comprising spherical shaped secondary particles that are formed by an aggregation of plural primary particles and expressed by a general formula (1): $Ni_xCo_yAl_zMn_tM_s(OH)_{2+a}$ ($x+y+z+t+s=1$, $0 \leq y \leq 0.3$, $0 < z \leq 0.1$, $0.001 < t \leq 0.05$, $0 \leq s \leq 0.05$, $0 \leq a \leq 0.5$, and M is at least one additional element that is selected from the group comprising Mg, Ca, Ti, V, Cr, Zr, Nb, Mo and W).

The secondary particles have an average particle size of 3 μm to 15 μm, and an index value [(d90−d10)/average particle size] that indicates the spread of the particle size distribution of 0.55 or less.

Moreover, the secondary particles comprise: a center section comprising minute primary particles of a composite hydroxide that is expressed by a general formula (2): $Ni_xCo_yAl_zMn_tM_s(OH)_{2+a}$ ($x+y+z+t+s=1$, $0 \leq y \leq 0.8$, $0 \leq z \leq 0.1$, $0.1 \leq t \leq 0.8$, $0 \leq s \leq 0.05$, $0 \leq a \leq 0.5$, and M is at least one additional element that is selected from the group comprising Mg, Ca, Ti, V, Cr, Zr, Nb, Mo and W); and an outer-shell section comprising plate shaped primary particles that are larger than the minute primary particles and that exists on the outside of the center section, and are constructed by composite hydroxide that is expressed by a general formula (3): $Ni_xCo_yAl_zMn_tM_s(OH)_{2+a}$ ($x+y+z+t+s=1$, $0 \leq y \leq 0.3$, $0 \leq z \leq 0.1$, $0 \leq t < 0.05$, $0 \leq s \leq 0.05$, $0 \leq a \leq 0.5$, and M is at least one additional element that is selected from the group comprising Mg, Ca, Ti, V, Cr, Zr, Nb, Mo and W); and aluminum exists in at least one of the center section and the outer-shell section, or exists as an aluminum compound on the surface of the secondary particles.

Preferably, the minute primary particles have an average particle size of 0.01 μm to 0.3 μm, and the plate shaped primary particles have an average particle size of 0.3 μm to 3 μm.

Preferably, the ratio of the thickness of the outer-shell section with respect to the particle size of the secondary particles is 5% to 45%.

Moreover, preferably, the aluminum is uniformly distributed inside the secondary particles and/or the aluminum compound uniformly coats the surface of the secondary particles.

Furthermore, preferably, the one kind of additional element or more is uniformly distributed inside the secondary particles and/or compound of one kind of additional element or more uniformly coats the surface of the secondary particles.

A third embodiment of the present invention relates to a production method for producing a cathode active material for a non-aqueous electrolyte secondary battery comprising a lithium nickel composite oxide having a layered hexagonal crystal structure that comprises spherical shaped secondary particles that are formed from an aggregation of plural primary particles and expressed by a general formula (4): $Li_{1+u}Ni_xCo_yAl_zMn_tM_sO_2$ (where, $-0.05 \leq u \leq 0.20$, $x+y+z+t+s=1$, $0 \leq y \leq 0.3$, $0 < z \leq 0.1$, $0.01 < t \leq 0.05$, $0 \leq s \leq 0.05$, and M is selected from at least one kind of additional element that is selected from the group of Mg, Ca, Ti, V, Cr, Zr, Nb, Mo and W).

Particularly, the production method of the present invention comprises:

a heat treatment process of heating the nickel composite hydroxide at a temperature of 105° C. to 750° C.;

a mixing process of mixing a lithium compound into the heat treated nickel composite hydroxide or a nickel composite oxide obtained by the heat treatment process to form a lithium mixture; and a calcination process of performing calcination of the lithium mixture obtained by the mixing process at a temperature of 700° C. to 800° C. in an oxidizing atmosphere.

Preferably, the lithium mixture is adjusted so that the ratio between the sum of the number of atoms of metals other than lithium included in the lithium mixture and the number of atoms of lithium is 1:0.95 to 1.2.

Moreover, preferably, in the calcination process, pre-calcination is performed before calcination at a temperature of 350° C. to 800° C.

Furthermore, preferably, the oxidizing atmosphere in the calcination process is an atmosphere having an oxygen concentration of 18% to 100% by volume.

A fourth embodiment of the present invention relates to a cathode active material for a non-aqueous electrolyte secondary battery comprising a lithium nickel composite oxide having a layered hexagonal crystal structure that comprises spherical shaped secondary particles that are formed from an aggregation of plural primary particles and expressed by a general formula (4): $Li_{1+u}Ni_xCo_yAl_zMn_tM_sO_2$ (where, $-0.05 \leq u \leq 0.20$, $x+y+z+t+s=1$, $0 \leq y \leq 0.3$, $0 < z \leq 0.1$, $0.01 < t \leq 0.05$, $0 \leq s \leq 0.05$, and M is selected from at least one kind of additional element that is selected from the group of Mg, Ca, Ti, V, Cr, Zr, Nb, Mo and W).

Particularly, in the cathode active material of the present invention the average particle size is 2 μm to 15 μm, the index value [(d90−d10)/average particle size] that indicates the spread of particle size distribution is 0.6 or less, and the cathode active material has a hollow structure comprising an outer-shell section in which an aggregation of primary particles are sintered, and a hollow section that exists inside the outer-shell section.

Preferably, the ratio of thickness of the outer-shell section with respect to the particle size of the secondary particles is 5% to 35%.

A fifth embodiment of the present invention relates to a non-aqueous electrolyte secondary battery. Particularly, the non-aqueous electrolyte secondary battery comprises a cathode that is formed using the cathode active material for a non-aqueous electrolyte secondary battery.

Effect of the Invention

With the present invention, it is possible to industrially provide a cathode active material for a non-aqueous electrolyte secondary battery comprising a lithium nickel composite oxide that, by having a uniform and suitable particle size and comprising a hollow structure, has a high specific surface area. By using this cathode active material as cathode material, a non-aqueous electrolyte secondary battery having excellent battery characteristics such as high capacity, high output, and a good cycling characteristic is obtained.

MODES FOR CARRYING OUT INVENTION

Figure 1:
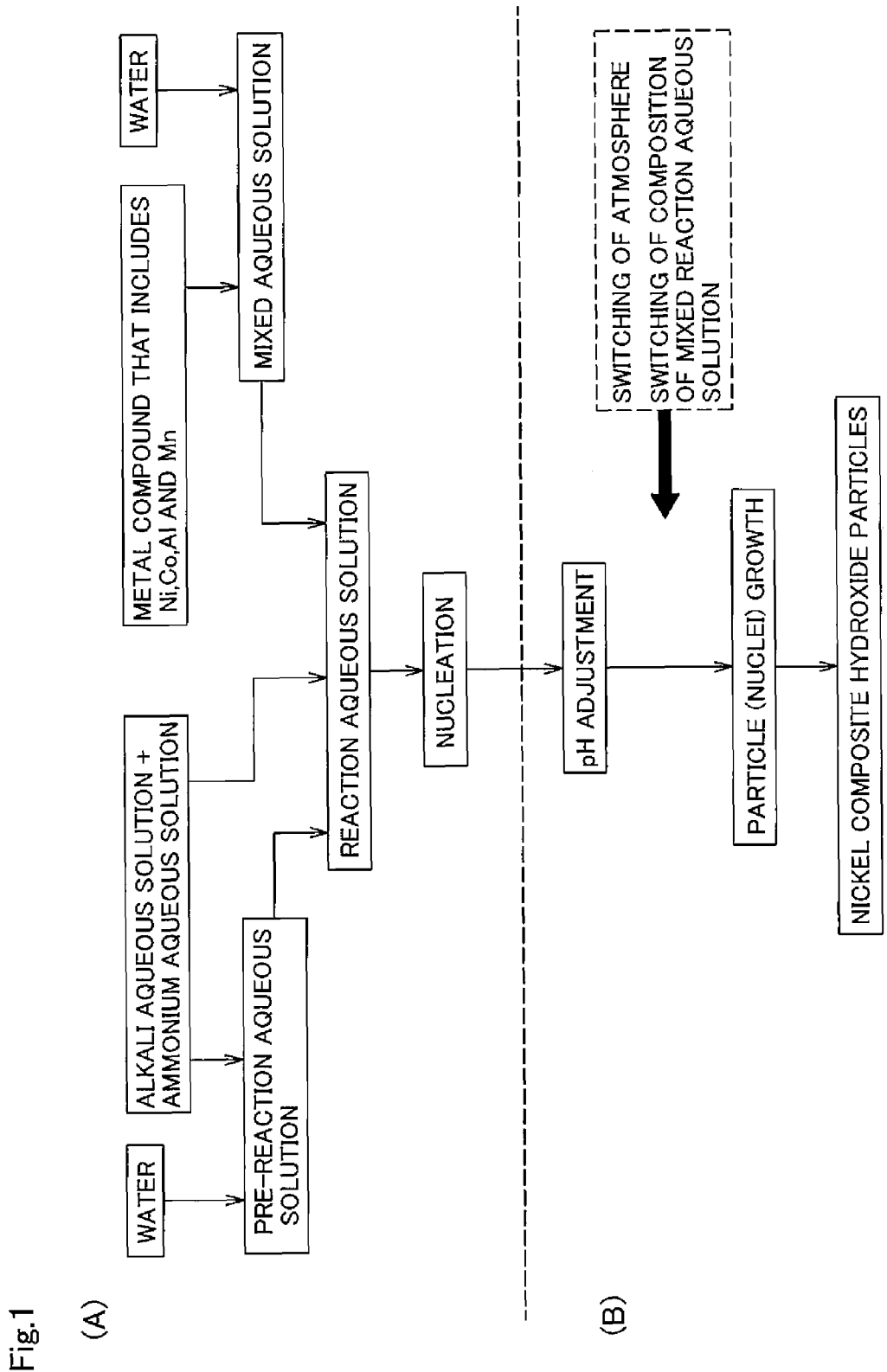
FIG. 1 is a flowchart of a production process for the nickel composite hydroxide of the present invention.

The present invention relates to: (1) a nickel composite hydroxide that is the raw material of a cathode active material for a non-aqueous electrolyte secondary battery (hereafter, referred to as a "composite hydroxide") and a production method thereof; (2) a cathode active material for a non-aqueous electrolyte secondary battery that uses the composite hydroxide and a production method thereof; and (3) a non-aqueous electrolyte secondary battery that uses the cathode active material for a non-aqueous electrolyte secondary battery in the cathode.

The effect of cathode active material for a non-aqueous electrolyte secondary battery that is used in a cathode for improving the performance of a non-aqueous electrolyte secondary battery is large. In order to obtain a cathode active material for a non-aqueous electrolyte secondary battery capable of obtaining excellent battery characteristics, the particle size, particle distribution and specific surface area of the particles thereof have an important role, and it is preferred that the cathode active material be adjusted to have a desired particle structure, and desired particle size and particle distribution.

In order to obtain this kind of cathode active material, it is necessary to use a composite hydroxide as the raw material thereof that has the desired particle structure, and desired particle size and particle distribution.

In the following, the invention according to (1) to (3) above will each be explained in detail, however, first, the composite hydroxide and the production method thereof, which are the main features of the present invention, will be explained. This composite hydroxide is particularly suitable as a raw material for the cathode active material having a hollow structure of the present invention, so in the following explanation, it is presumed that the composite hydroxide will be used as the raw material of a cathode active material.

(1-1) Composite Hydroxide
(Particle Composition)

The composite hydroxide of the present invention has a composition that is expressed by the general formula (1); $Ni_xCo_yAl_zMn_tM_s(OH)_{2+a}$ (x+y+z+t+s=1, 0≤y≤0.3, 0<z≤0.1, 0.001<t≤0.05, 0≤s≤0.05, 0≤a≤0.5, and M is at least one additional element that is selected from the group comprising Mg, Ca, Ti, V, Cr, Zr, Nb, Mo and W).

When lithium nickel composite oxide is produced as the raw material for a composite hydroxide having this kind of composition, and a non-aqueous electrolyte secondary battery is manufactured using that as the cathode active material, it can be assumed that the value of the measured cathode resistance will be low, and the battery performance will be good. The composition ratio (Ni:Co:Al:Mn:M) of this composite hydroxide is preserved in the obtained cathode active material as well. Therefore, the composition ratio of the composite hydroxide of the present invention is adjusted to become the same as the composition ratio that is desired for the cathode active material to be obtained.

In the composite hydroxide of the present invention and the lithium nickel composite oxide that is obtained using that as a raw material, the properties brought about by each individual element, and the regulated amount of each element contained is well known and is according to related technical literature that includes JP2008-147068 (A) and JP2004-253174 (A), so an explanation thereof will be omitted.

However, in the composite hydroxide of the present invention, aluminum, which is a component element thereof, can be uniformly distributed well inside secondary particles, and/or can be uniformly coated well over the surface of secondary particles. Aluminum is added in order to improve heat stability, however, by uniformly distributing aluminum inside and/or on the surface, even if only a small amount, not only it is possible to obtain the effect above in all of the particles, but it is also possible to suppress a decrease in capacity. In order to obtain the effect above with even a smaller amount of aluminum, it is preferred that the aluminum concentration on the surface of the particles be higher than that inside the particles.

Moreover, the additional elements as well are added in order to improve the durability and output characteristics of the battery, and preferably are uniformly distributed inside and/or on the surface of the particles, however, when obtaining the effect of suppressing a decrease in capacity with even a smaller amount, the additional elements can be caused to exist on the surface of the particles, or the concentration of the additional elements on the surface can be increased.

(Particle Structure)

Figure 4:
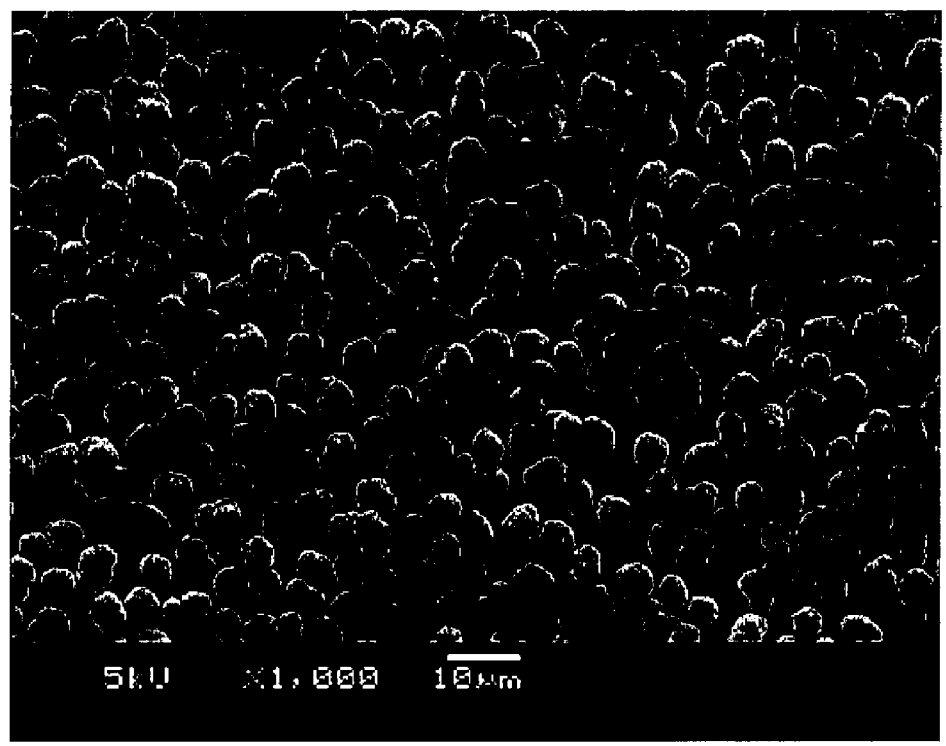
FIG. 4 is an SEM photograph (observation magnification rate: 1,000×) of the nickel composite hydroxide of the present invention.
Figure 5:
FIG. 5 is an SEM photograph (observation magnification rate: 10,000×) of the nickel composite hydroxide of the present invention.

As illustrated in FIG. 4, the composite hydroxide of the present invention comprises spherical particles as a whole. More specifically, as illustrated in FIG. 5, this composite hydroxide comprises spherical secondary particles that are formed by an aggregation of plural primary particles, and more specifically, the particle structure has a center section that is formed by an aggregation of minute primary particles, and an outer-shell section that exists on the outside of the center section and that is formed by an aggregation of plate-shaped primary particles that are larger than the minute primary particles.

By comprising this kind of structure, in the sintering process of forming lithium nickel composite oxide, which is the cathode active material of the present invention, dispersion of lithium inside the particles is sufficiently performed, so a cathode active material having a good and uniform distribution of lithium is obtained.

Here, the composite hydroxide of the center section has a composition that is expressed by the general formula (2) $Ni_xCo_yAl_zMn_tM_s(OH)_{2+a}$ (x+y+z+t+s=1, 0≤y≤0.8, 0≤z≤0.1, 0.1≤t≤0.8, 0≤s≤0.05, 0≤a≤0.5, and M is at least one additional element that is selected from the group comprising Mg, Ca, Ti, V, Cr, Zr, Nb, Mo and W). Normally, when obtaining a lithium nickel composite oxide using only a composite hydroxide such as this that has a large manganese content, calcination must be performed at a high temperature of about 900° C.

On the other hand, the composite hydroxide of the outer-shell section has a composition that is expressed by the general formula (3): $Ni_xCo_yAl_zMn_tM_s(OH)_{2+a}$ (x+y+z+t+s=1, 0≤y≤0.3, 0≤z≤0.1, 0≤t<0.05, 0≤s≤0.05, 0≤a≤0.5, and M is at least one additional element that is selected from the group comprising Mg, Ca, Ti, V, Cr, Zr, Nb, Mo and W). The calcination temperature in order to obtain a lithium composite oxide using a composite hydroxide having a low manganese content such as this is 700° C. to 800° C.

In the composite hydroxide of the present invention, even though the manganese content of the composite hydroxide existing in the center section is large, the center section comprises extremely minute primary particles, and the density is considered to be low, so contraction due to sintering begins at a lower temperature than the composite hydroxide of the outer-shell section, and that contraction rate is also large. Therefore, in the structure of the present invention, even at 700° C. to 800° C., which is the calcination temperature of the outer-shell section, the center section undergoes sufficient contraction, and the location where the center section existed becomes a sufficiently large space. As a result, the cathode active material that is obtained after calcination has a hollow structure.

Moreover, for the outer-shell section, a structure in which secondary particles are formed by an aggregation of plate-shaped primary particles in a random direction is more preferred. This is because, by forming an aggregate of plate-shaped primary particles in a random direction, uniform spacing occurs between primary particles, and when mixed with a lithium compound and calcination is performed, the molten lithium compound spreads into the secondary particles and the dispersion of lithium is sufficiently performed.

Furthermore, by aggregating in a random direction, contraction of the center section during the calcination process occurs evenly, so it is possible to form space inside the cathode active material that is sufficiently large, and from this point as well, structure such as described above is preferred.

In order to form space during calcination, preferably the minute primary particles of the center section have an average particle size of 0.01 μm to 0.3 μm, and preferably the average particle size of the plate-shaped primary particles of the outer-shell section is 0.3 μm to 3 μm. When the average particle size of the minute primary particles in the center section is less than 0.01 μm, aggregation of primary particles becomes insufficient, and a sufficiently large center section is not formed in the obtained composite hydroxide, and when the average particle size is greater than 0.3 μm, lowering the temperature at the start of sintering as described above, and contraction are not sufficient, so a sufficiently large space may not be obtained after calcination. On the other hand, when the average particle size of the plate-shaped primary particles of the outer-shell section is less than 0.3 μm, sintering during calcination of the plate-shaped primary particles is performed at a lower temperature, so a sufficiently large space is not obtained after calcination, and when the average particle size is greater than 0.3 μm, in order to obtain sufficient crystallinity of the obtained cathode active material, it is necessary to increase the calcination temperature, and there is a high probability that sintering will occur between secondary particles and the particle size of the obtained cathode active material will exceed the specified range.

Furthermore, preferably the minute primary particles are plate shaped and/or needle shaped. By making the minute primary particles plate shaped and/or needle shaped, the density in the center section becomes sufficiently low, the temperature at the start of sintering becomes sufficiently low, large contraction occurs by sintering and a sufficiently large space occurs.

In secondary particles having this kind of structure, the ratio of the thickness of the outer-shell section with respect to the particle size of the secondary particles is preferably 5% to 45%, and more preferably 7% to 35%. This is because, a center section that is large enough to form a hollow structure in cathode active material that is obtained using this composite hydroxide as the raw material is necessary. In other words, even in the cathode active material, the ratio of the thickness of the outer-shell section with respect to the particle size of the secondary particles is mainly maintained from the ratio of secondary particles of the composite hydroxide. Therefore, by keeping the ratio of the thickness of the outer-shell section with respect to the particle size of secondary particles in the composite hydroxide within the range described above, it becomes possible to form a sufficiently large center section in the secondary particles of the lithium nickel composite oxide. When the thickness of the outer-shell section is made thin so that the ratio with respect to the particle size of the secondary particles is less than 5%, contraction of the secondary particles of the composite hydroxide becomes large in the calcination process when producing the cathode active material, and the particle size distribution in the cathode active material may worsen due to sintering that occurs between secondary particles of the lithium nickel composite oxide. On the other hand, when the ratio is greater than 45%, there is a problem in that a sufficiently large center section is not formed.

The particle size of the minute primary particles and plate-shaped primary particles, and the ratio of the thickness of the outer-shell section with respect to the particle size of the secondary particles can be measured by observation of the cross section of the secondary particles of the composite hydroxide using a scanning electron microscope.

For example, by embedding plural secondary particles of a composite hydroxide in resin or the like and performing a cross-section polishing process, a state can be obtain in which the cross section of the particles can be observed. The particle size of minute primary particles and plate-shaped primary particles can be found by measuring the maximum particle size of the cross sections of preferably ten or more primary particle, and then calculating the average value.

Moreover, the ratio of the thickness of the outer-shell section with respect to the particle size of secondary particles is found as described below. First, particles of which the cross section of the center of the particles can be observed are selected from the secondary particles in the resin, and the distance between two points where the distance between the outer circumference of the outer-shell section and the inner circumference surface on the center section side is a minimum is measured at three or more arbitrary locations, and the average thickness of the outer-shell section is found for each particle. The distance between two arbitrary points where the distance on the outer circumference of a secondary particle is a maximum is taken to be the secondary particle size, and by dividing the average thickness by this secondary particle size, the ratio of thickness of the outer-shell section is found for each particle. Then by taking the average of the ratios for each of the particles that were found for ten or more particles, it is possible to find the ratio of the thickness of the outer-shell section with respect to the particle size of secondary particles for the secondary particles in the composite hydroxide.

(Average Particle Size)

The composite hydroxide of the present invention is adjusted so that the average particle size of the secondary particles is 3 μm to 15 μm, and preferably 3 μm to 7 μm. By making the average particle size 3 μm to 15 μm, it is also possible to adjust the nickel composite oxide (hereafter, referred to as the "composite oxide"), which is the cathode active material that is obtained using the composite hydroxide of the present invention as a raw material, to a specified average particle size (2 μm to 15 μm). In this way, the particle size of the composite hydroxide is correlated with the particle size of the obtained cathode active material, so has an effect on the battery characteristics of a battery that uses this cathode active material in the cathode material.

More specifically, when the average particle size of the composite hydroxide is less than 3 μm, the average particle size of the cathode active material that is obtained also becomes small, and thus the packing density of the cathode decreases and the battery capacity per volume decreases. On the other hand, when the average particle size of the composite hydroxide is greater than 15 μm, the specific surface area of the cathode active material decreases, and due to a reduction in the boundary surface with the electrolyte, the cathode resistance increases and the output characteristics of the battery decrease.

(Particle Size Distribution)

The composite hydroxide of the present invention is adjusted so that the ratio [(d90−d10)/average particle size], which is an index indicating the spread of the particle size distribution of the composite hydroxide, is 0.55 or less. The particle size distribution of the cathode active material is strongly influenced by the particle size distribution of the composite hydroxide, which is the raw material, so when minute particles or rough particles are mixed in the composite hydroxide, the same particles exist in the cathode active material as well. In other words, when the ratio [(d90−d10)/average particle size] is greater than 0.55 and there is a large particle size distribution, minute particles or rough particles also exist in the cathode active material.

When a cathode is formed using a cathode active material in which there is a large amount of minute particles, there is a possibility that heat will be generated due to localized reaction with the minute particles, and not only will there be a decrease in the safety of the battery, there will be selective deterioration of minute particles, and the cycling characteristic of the battery will become poor. On the other hand, when a cathode is formed using a cathode active material in which there is a large amount of rough particles, there will be insufficient reaction surface area between the electrolyte and the cathode active material, and thus there will be a drop in battery output due to an increase in reaction resistance.

Therefore, by adjusting the composite hydroxide of the present invention so that the ratio [(d90−d10)/average particle size] is 0.55 or less, the range of the particle size distribution of the cathode active material that is obtained by using this composite hydroxide as a raw material also becomes narrow, and it is possible to made the particle size of the composite hydroxide more uniform. In other words, it is possible to adjust the particle size distribution of the cathode active material so that the ratio [(d90−d10)/average particle size] is 0.60 or less. As a result, it possible to achieve a good cycling characteristic and high output for a battery that uses the cathode active material, which was formed using the composite hydroxide of the present invention as a raw material, as the cathode material.

In the index [(d90−d10)/average particle size] that indicates the spread of the particle size distribution, d10 is the particle size of the particles whose totaled volume makes up 10% of the total volume of all particles when the number of particles of each particle size is totaled starting from the smallest, and d90 is the particle size of the particles whose totaled volume makes up 90% of the total volume of all particles when the number of particles of each particle size is totaled in a similar manner.

The methods for finding the average particle size, d90 and d10 are not particularly limited, and for example, they can be found from the value of the calculated volume that was measured by laser diffraction scattering particle size analysis. When d50 is used as the average particle size, as in the case of d90, the particle size of particles whose totaled volume is 50% of the total volume of all of the particles can be used.

(1-2) Production Method for Composite Hydroxide

The production method for producing the composite hydroxide of the present invention is a method of producing a composite hydroxide that is expressed by the general formula (1), and comprises: (A) a nucleation process for generating nuclei; and (B) a particle growth process that allows the nuclei that were generated in the nucleation process to grow.

In other words, in conventional continuous crystallization methods, the nucleation reaction and particle growth reaction proceed simultaneously inside the vessel, so the range of the particle size distribution of the secondary particles of the composite hydroxide obtained becomes large. On the other hand, a main feature of the production method for producing a composite hydroxide of the present invention, is that by clearly separating the time during which the nucleation reaction occurs (nucleation process) and the time during which the particle growth reaction occurs (particle growth process), a narrow particle size distribution is achieved in the composite hydroxide that is obtained.

Furthermore, another feature of this method is that, by controlling the atmosphere during the crystallization reaction for each process, as well as controlling the manganese content in a mixed aqueous solution of compounds such as nickel, cobalt, aluminum and the like that is dissolved in water so as to be within a specified range, the particle structure of the composite hydroxide that is obtained is a double structure comprising: a center section that comprises minute primary particles that are formed from the composite hydroxide expressed by general formula (2); and an outer-shell section that comprises plate-shaped primary particles that are larger than the minute primary particles and that are formed from the composite hydroxide expressed by the general formula (3).

Figure 2:
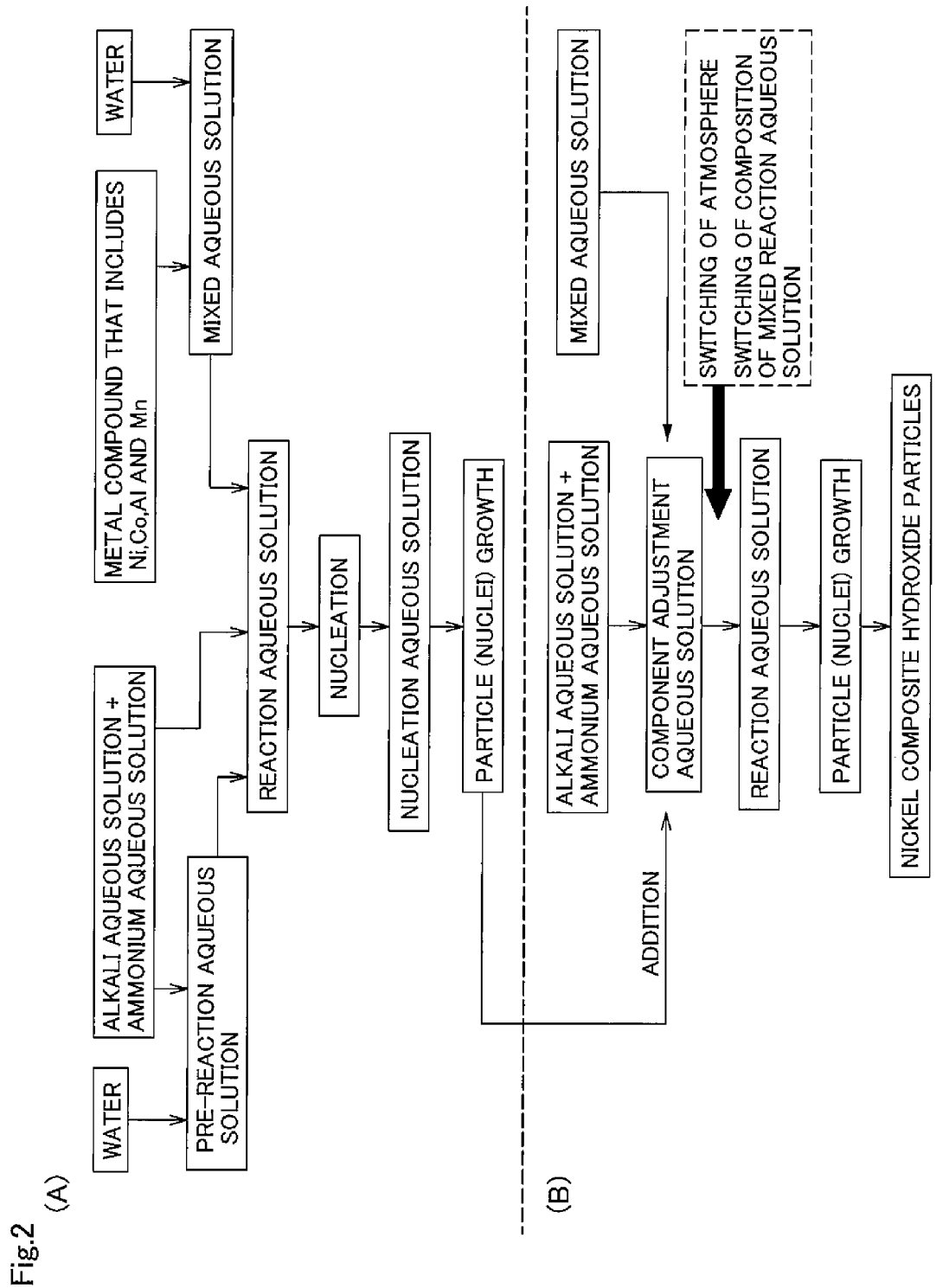
FIG. 2 is a flowchart of another production process for the nickel composite hydroxide of the present invention.
Figure 3:
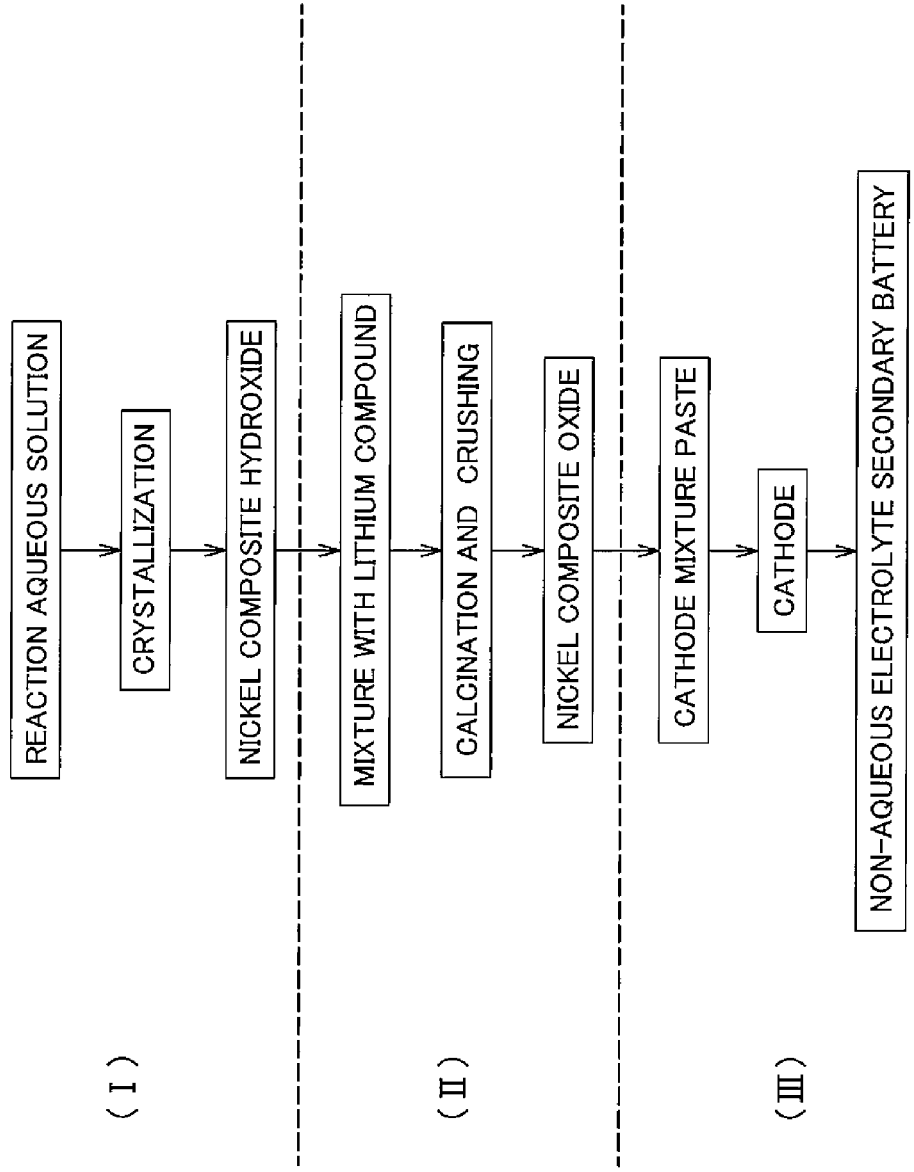
FIG. 3 is a flowchart of a process from after the nickel composite hydroxide of the present invention is produced until a non-aqueous electrolyte secondary battery is manufactured.

First, a summary of the production method for producing composite hydroxide of the present invention will be explained based on FIG. 1. In FIG. 1 and FIG. 2, (A) corresponds to the nucleation process, and (B) corresponds to the particle growth process.

FIRST EMBODIMENT a) Nucleation Process

As illustrated in FIG. 1, a mixed aqueous solution is made by dissolving plural metal compounds in water at a specified ratio so that the composition ratio of metals is as expressed by the general formula (a): $Ni_xCo_yAl_zMn_tM_s$ ($x+y+z+t+s=1$, $0 \le y \le 0.8$, $0 \le z \le 0.1$, $0.1 \le t \le 0.8$, $0 \le s \le 0.05$, and M is at least one additional element that is selected from the group comprising Mg, Ca, Ti, V, Cr, Zr, Nb, Mo and W) and so as to correspond to the general formula (2) for the composite hydroxide.

Particularly, the manganese content in this mixed aqueous solution must be controlled so that the 't' in the general formula (a) is no less than 0.1 and no greater than 0.8, and preferably is controlled to be no less than 0.2 and no greater than 0.7, and even more preferably controlled to be no less than 0.3 and no greater than 0.6. When 't' is less than 0.1, minute primary particles are not obtained, and when 't' exceeds 0.8, contraction during calcination is small, so a sufficient hollow structure is not obtained.

Moreover, in order to make the composition of the composite hydroxide uniform, the cobalt content is controlled so that 'y' in the general formula (a) is no less than 0 and no greater than 0.8, and preferably no less than 0 and no greater than 0.5.

On the other hand, an aqueous solution is formed by mixing an alkali aqueous solution such as a sodium hydroxide aqueous solution, an ammonia aqueous solution that includes an ammonium ion donor and water in the reaction vessel. The pH value of this aqueous solution (hereafter, referred to as the "aqueous solution before reaction") is adjusted to be within the range 12.0 to 14.0 at a reference liquid temperature of 25° C. by adjusting the amount of alkali aqueous solution that is supplied. Moreover, the concentration of the ammonium ions in the aqueous solution before reaction is adjusted to be within the range 3 g/L to 25 g/L by adjusting the amount of ammonia aqueous solution that is supplied. The temperature of the aqueous solution before reaction is also adjusted preferably to be 20° C. or greater, and even more preferably to be 20° C. to 60° C. The pH of the aqueous solution and the concentration of the ammonium ions in the reaction vessel can be measured using a typical pH meter and ion meter.

After the temperature and pH value of the aqueous solution before reaction have been adjusted inside the reaction vessel, the mixed aqueous solution is supplied into the reaction vessel while stirring the aqueous solution before reaction. As a result, a nucleation aqueous solution as a reaction aqueous in this nucleation process, which is a mixture of the aqueous solution before reaction and the mixed aqueous solution, is formed inside the reaction vessel, and minute nuclei of the composite hydroxide are generated in this nucleation aqueous solution. At this time, the pH value of the nucleation aqueous solution is within the range described above, so the generated nuclei hardly grow at all, and the generation of nuclei preferentially occurs.

During nucleation, as the mixed aqueous solution is supplied, the pH value and ammonium ion concentration of the nucleation aqueous solution changes, so the alkali aqueous solution and ammonia aqueous solution together with the mixed aqueous solution are supplied to the nucleation aqueous solution in order to perform control so that the pH value of the nucleation aqueous solution is maintained within the range of 12.0 to 14.0 at a reference liquid temperature of 25° C., and the concentration of ammonium ions is maintained within the range 3 g/L to 25 g/L.

By supplying the mixed aqueous solution, alkali aqueous solution and ammonia aqueous solution to the nucleation aqueous solution, new nuclei are continuously generated inside the nucleation aqueous solution. Then, after a specified amount of nuclei have been generated inside the nucleation aqueous solution, the nucleation process ends.

The amount of nuclei generated in the nucleation process is not particularly limited, however, in order to obtain a composite hydroxide having a good particle size distribution, the amount is preferably 0.1% to 1.5% the entire amount, or in other words, the total metallic salts that are supplied in order to obtain the composite hydroxide, and more preferably is 1.2% or less. It is possible to determine whether or not the specified amount of nuclei have been generated according to the amount of metallic salts that have been added to the nucleation aqueous solution.

b) Particle Growth Process

After the nucleation process, the pH value of the nucleation aqueous solution is adjusted to a pH value of 10.5 to 12.0 at a reference temperature of 25° C. to obtain a particle growth aqueous solution, which is the reaction aqueous solution in the particle growth process. More specifically, control of the pH value during this adjustment is performed by adjusting the amount of alkali aqueous solution that is supplied.

By adjusting the pH value of the particle growth aqueous solution within the range described above, the particle growth reaction is preferentially performed over the nucleation reaction. Therefore, in the particle growth process, new nuclei are hardly generated, and the nuclei grow (particles grow) and a composite hydroxide having a specified particle size is formed.

Similarly, as particles grow due to the supply of the mixed aqueous solution, the pH value and concentration of ammonium ions of the particle growth aqueous solution changes, so alkali aqueous solution and ammonia aqueous solution are also supplied together with the mixed aqueous solution to the particle growth aqueous solution in order to perform control so that the pH value of the particle growth aqueous solution is maintained within the range of 10.5 to 12.0 at a reference liquid temperature of 25° C., and the concentration of ammonium ions is maintained within the range of 3 g/L to 25 g/L.

After a specified amount of time elapses after the particle growth process has started, the reaction atmosphere that will be described later is switched, and at the same time, the compositional ratio of each of the metals included in the supplied mixed aqueous solution is switched to a composition that is expressed by the general formula (b): $Ni_xCo_yAl_zMn_tM_s$ ($x+y+z+t+s=1$, $0 \leq y \leq 0.3$, $0 \leq z \leq 0.1$, $0 \leq t < 0.05$, $0 \leq s \leq 0.05$, and M is at least one additional element that is selected from the group comprising Mg, Ca, Ti, V, Cr, Zr, Nb, Mo and W). As a result, the particle structure of the composite hydroxide that is obtained can be secondary particles having a center section that comprises minute primary particles that were formed using the composite hydroxide that is expressed by the general formula (2), and an outer-shell section that comprises plate-shaped primary particles that are larger than the minute primary particles and that were formed using the composite hydroxide that is expressed by the general formula (3).

The manganese content of the mixed aqueous solution after switching must be controlled such that 't' in the general formula (b) is no less than 0 and no greater than 0.05, and is controlled so as to be within the manganese content range of general formula (1) for the overall composite hydroxide; however, in order that the battery capacity does not decrease, the manganese content is preferably controlled so as to be no less than 0 and no greater than 0.01. When 't' is 0.05 or greater, there is a problem in that the manganese content is too large in the overall particles.

After that, at the instant that the particles of the composite hydroxide have grown to a specified particle size, the reaction is stopped and the particle growth process ends.

(Controlling the Particle Size of the Composite Hydroxide)

The particle size of the composite hydroxide (secondary particles) can be controlled by the time of the particle growth process, so by continuing the particle growth process until the particles have been grown to the desired particle size, it is possible to obtain a composite hydroxide having the desired particle size.

Moreover, the particle size of the composite hydroxide can be controlled by not only the particle growth process, but can also be controlled by the pH value during the nucleation process and the amount of raw material that is added in order to generate nuclei. In other words, by making the pH value during the nucleation process a high pH value, or by increasing the amount of raw material that is added by lengthening the nucleation time, the number of nuclei generated increases. As a result, it is possible to make the particle size of the composite hydroxide small even when the particle growth process is performed under the same conditions. On the other hand, by performing control so that the number of nuclei is small, it is possible to make the particle size of the composite hydroxide that is obtained large. Therefore, preferably the relationship between the amount of added metal salts that are added to each of the reaction aqueous solutions and the particles obtained is found in advance by experimentation for both the nucleation process and the particle growth process.

c) Characteristics

As described above, in the production method for producing composite hydroxide of the present invention, generation of nuclei is preferentially performed in the nucleation process, and during this process hardly any nuclei growth occurs, then, conversely, during the particle growth process, only nuclei growth occurs, and hardly any new nuclei are generated. Therefore, in the nucleation process, it is possible to form homogeneous nuclei having a narrow particle size distribution range, and, in the particle growth process, it is possible to grow the nuclei homogeneously. Consequently, in the production method for producing composite hydroxide of the present invention, it is possible to obtain a homogeneous composite hydroxide having a narrow particle size distribution range.

In both processes, the metal ions crystallize and precipitate as nuclei or composite hydroxide, so the ratio of liquid component with respect to the metallic component of each of the reaction aqueous solutions increases. In that case, it appears that the concentration of the supplied mixed aqueous solution has decreased, and particularly during the particle growth process, there is a possibility that the composite hydroxide will not grow sufficiently. Therefore, in order to suppress an increase in the liquid component in the reaction aqueous solutions, preferably after the nucleation process has ended and during the particle growth process, part of the reaction aqueous solution, and particularly part of the liquid component of the particle growth aqueous solution is removed from the reaction vessel. More specifically, the supply and mixing of the mixed aqueous solution, alkali aqueous solution and ammonia aqueous solution in the particle growth aqueous solution is stopped, the nuclei and composite hydroxide are precipitated out, and the supernatant liquid of the particle growth aqueous solution is removed. As a result, it is possible to increase the relative concentration of the mixed aqueous solution in the particle growth aqueous solution. Then, composite hydroxide can be grown in this state in which the relative concentration of mixed aqueous solution is high, so it is possible to make the particle size distribution of the composite hydroxide narrower, and it is also possible to increase the overall density of secondary particles in the composite hydroxide.

In the embodiment illustrated in FIG. 1, particle growth aqueous solution is formed by adjusting the pH value of the nucleation aqueous solution after the nucleation process has ended, and then the particle growth process is performed after the nucleation process, so there is an advantage in that moving to the particle growth process can be performed quickly. Furthermore, there is an advantage in that moving from the nucleation process to the particle growth process is performed by simply adjusting the pH value of the reaction aqueous solution, and adjustment of the pH can also be performed easily by temporarily stopping the supply of alkali aqueous solution. The pH value of the reaction aqueous solution can also be adjusted by adding an inorganic acid that is of the same type as the acid of the metal compounds, for example, by adding sulfuric acid in the case of sulfate.

SECOND EMBODIMENT

In a different embodiment as illustrated in FIG. 2, in addition to the nucleation aqueous solution, it is possible to form a component adjusting aqueous solution that is adjusted to a pH value and ammonium ion concentration suitable for particle growth, and then an aqueous solution that includes the nuclei generated by the nucleation process in a separate reaction vessel (nucleation aqueous solution, and preferably part of the liquid component from the nucleation aqueous solution) is added to the component adjusting aqueous solution to form a reaction aqueous solution, and then perform the particle growth process using this reaction aqueous solution as the particle growth aqueous solution.

In this case, separating the nucleation process and the particle growth process can be more definitely performed, so the state of the reaction aqueous solution in each process can be set to the most optimum conditions for each process. Particularly, from the instant that the particle growth process begins, the pH value of the particle growth aqueous solution can be set to the most optimum condition. Moreover, the composite hydroxide that is formed in the particle growth process can have a narrower particle size distribution range, and a more homogeneous composite hydroxide can be obtained.

In the following, the reaction conditions in the crystallization reaction will be explained, however, difference in the nucleation process and the particle growth process are only in a range in which it is possible to control the pH value of the reaction aqueous solution and the atmosphere in the reaction vessel, and conditions such as the metal compounds, the ammonium ion concentration in the reaction solution, the reaction temperature are essentially the same in both processes.

(Reaction Atmosphere)

The reaction atmosphere in the nucleation process of the present invention is an oxidizing atmosphere, and more specifically, must be an oxidizing atmosphere in which the oxygen concentration in the space inside the reaction vessel is 1% by volume. Preferably the oxidizing atmosphere has an oxygen concentration that exceeds 10% by volume, and an oxidizing atmosphere that can be easily controlled such as an air atmosphere (oxygen concentration: 21% by volume) is particularly preferred. By making the atmosphere such that the oxygen concentration exceeds 1% by volume, it is possible to make the average particle size of the primary particles 0.01 µm to 0.3 µm. When the oxygen concentration is 1% by volume or less, the average particle size of the primary particles in the center section may exceed 0.3 µm. The maximum oxygen concentration is not particularly limited, however when the oxygen concentration exceeds 30% by volume, there are cases in which the average particle size of the primary particles becomes less than 0.01 μm, which is not preferable.

On the other hand, the reaction atmosphere in the particle growth process of the present invention, at a specified time that will be described later, must switch from the oxidizing atmosphere described above to an atmosphere in the weak oxidizing to non-oxidizing range, or more specifically, to an atmosphere in which the oxygen concentration of the space inside the reaction vessel is 1% by volume or less. Preferably, the atmosphere is controlled to be a mixed atmosphere of oxygen and an inert gas so that the oxygen concentration is 0.5% by volume or less, and more preferably 0.2% by volume or less. By making the oxygen concentration of the space inside the reaction vessel 1% by volume or less and growing particles in that atmosphere, unnecessary oxidation of the particles is suppressed, and it is possible to promote growth of the primary particles and obtain secondary particles having a precise highly dense outer-shell section comprising uniform primary particles having an average particle size of 0.3 μm to 3 μm that is larger than the particle size of the primary particles of the center section.

Means for maintaining the space inside the reaction vessel in this kind of atmosphere is not particularly limited, however, it is possible to cause an inert gas such as nitrogen to flow into the space inside the reaction vessel, or furthermore to cause inert gas to bubble into the reaction solution.

(Switching the Composition of the Mixed Aqueous Solution and the Reaction Atmosphere)

In this way, in the present invention, it is necessary to control the reaction atmosphere and to change the composition of the mixed aqueous solution in each process according to the purpose of that process. In other words, the particle structure of the composite hydroxide of the present invention, as described above, is formed by controlling the composition of the mixed aqueous solution and the reaction atmosphere for both the nucleation process and the particle growth process. That is, by using an oxidizing atmosphere for the nucleation process and part of the initial period of the particle growth process, and using a mixed aqueous solution having the composition expressed by the general formula (a), a porous, low-density center section is formed that comprises minute primary particles, and then in the particle growth process after that, the atmosphere is switched from an oxidizing atmosphere to an atmosphere in the weak oxidizing or non-oxidizing range, and by switching the composition of the mixed aqueous solution to the composition expressed by the general formula (b), it is possible to form a secondary particle structure having a fine, highly dense outer-shell section that comprises plate-shaped primary particles that are larger than the minute primary particles around the outside of the center section, and an overall composition of the secondary particles of the composite hydroxide that is expressed by the general formula (1) can be obtained.

Switching the atmosphere and the mixed aqueous solution in the particle growth process must be controlled so as to obtain the center section within a range that minute particles do not occur in the cathode active material that is finally obtained, and that the cycling characteristic does not become poor. More specifically, this switching is performed at timing when the time from the start of the particle growth process is within the range 1% to 15%, and preferably in the range 2% to 12.5% and even more preferably in the range 4% to 10% of the overall time of the particle growth process (from the start of this process to the end of reaction). When this switching is performed after 15% of the overall time of the particle growth process, not only does the center section that is formed becomes large, and the thickness of the outer-shell section become too thin with respect to the particle size of the secondary particles, but the manganese content also increases, so the discharge and charge capacity decreases. On the other hand, when this switching is performed at less than 1% of the overall time of the particle growth process, the center section becomes too small, or secondary particles having a sufficiently hollow structure are not formed.

(pH Control)

In the nucleation process, the pH value of the reaction aqueous solution must be controlled so as to be within the range 12.0 to 14.0 at a reference liquid temperature of 25° C. When the pH value is greater than 14.0, the nuclei that are generated are too minute, and there is a problem in that gelling of the reaction aqueous solution occurs. Moreover, when the pH value is less than 12.0, a nuclei growth reaction occurs together with nucleation, so the range of the particle size distribution of the nuclei that are generated becomes large and is not uniform. In other words, in the nucleation process, by controlling the pH value of the reaction aqueous solution to be within the range described above, growth of the nuclei can be suppressed so that only nuclei generation occurs, and thus it is possible to make the particle size distribution range of the nuclei that are generated uniform and narrow.

On the other hand, in the particle growth process, the pH value of the reaction aqueous solution must be controlled so as to be within the range 10.5 to 12.0 at a reference liquid temperature of 25° C. When the pH value is greater than 12.0, a large number of new nuclei are generated, and minute secondary particles are generated, so a composite hydroxide having a narrow particle size distribution range cannot be obtained. Moreover, when the pH value is less than 10.5, the solubility due to ammonium ions increases, and the amount of metal ions that cannot be precipitated out and that remain in the solution increases, so productivity becomes poor. In other words, in the particle growth process, by controlling the pH value of the reaction aqueous solution so as to be within the range described above, growth of the nuclei that were generated in the nucleation process preferentially occurs, and the generation of new nuclei is suppressed, so it is possible to make the particle size distribution range of the composite hydroxide that is obtained uniform and narrow.

In both the nucleation process and the particle growth process, the fluctuation width of the pH is preferably controlled to be within ±0.2 of the set value. When the fluctuation width of the pH is large, nucleation and particle growth are not fixed, and it may not be possible to obtain a uniform composite hydroxide having a narrow particle size distribution range.

A pH value of 12.0 is the boundary condition between nucleation and nuclei growth, so when the pH value is 12.0, it is possible for the condition for the nucleation process or the particle growth process to occur depending on whether or not there are nuclei in the reaction aqueous solution.

In other words, after the pH value of the nucleation process is made to be greater than 12.0 and a large amount of nuclei are generated, and then the pH value becomes 12.0 in the particle growth process, a large amount of nuclei exist in the reaction aqueous solution, so the growth of nuclei preferentially occurs, and a composite hydroxide having a narrow particle size distribution and a relatively large particle size is obtained.

On the other hand, in a state in which there are no nuclei in the reaction aqueous solution, or in other words, when the pH value in the nucleation process was 12.0, there are no nuclei to grow, so nucleation preferentially occurs, and by making the pH value in the particle growth process less than 12.0, the generated nuclei grow and a good composite oxide is obtained.

In either case, control should be performed so that the pH value of the particle growth process is lower than the pH value of the nucleation process, and in order to clearly separate nucleation and particle growth, the pH value of the particle growth process is preferably lower than the pH value of the nucleation process by 0.5 or more, and more preferably is lower by 1.0 or more.

(Alkali Aqueous Solution)

The alkali aqueous solution that adjusts the pH of the reaction aqueous solution is not particularly limited, and, for example, it is possible to use an alkali metal hydroxide aqueous solution such as sodium hydroxide or potassium hydroxide aqueous solution. In the case of using this kind of alkali metal hydroxide, the alkali metal hydroxide can be added directly to the reaction aqueous solution, however, from the aspect of being able to easily control the pH value of the reaction aqueous solution in the reaction vessel, preferably the alkali metal hydroxide is added to the reaction aqueous solution in the reaction vessel as an aqueous solution.

Moreover, the method for adding the alkali aqueous solution to the reaction vessel is not particularly limited, however, should be added using a flow-controllable pump such as a metering pump while sufficiently stirring the reaction aqueous solution so that the pH value of the reaction aqueous solution is kept within a specified range.

(Ammonia Concentration)

The ammonia concentration in the reaction aqueous solution is preferably kept at a fixed value within the range 3 g/L to 25 g/L in order that the problems described below do not occur. Ammonia is used as a complexing agent, so when the ammonia concentration is less then 3 g/L, the solubility of metal ions cannot be kept constant, and thus it is not possible to form the primary particle of the composite hydroxide so as to have a uniform shape and particle size, and because it is easy to form gel-like nuclei, it also becomes easy for the particle size distribution to become large. On the other hand, when the ammonia concentration is greater than 25 g/L, the solubility of the metal ions becomes too great, and the amount of metal ions remaining in the reaction aqueous solution increases, so a shift in the composition occurs.

Moreover, as the ammonia concentration fluctuates, the solubility of metal ions fluctuates, and hydroxide having a uniform shape and particle size is not formed, so preferably the ammonia concentration is maintained at a fixed value. For example, preferably the ammonia concentration is maintained at a desired concentration with a width between the upper limit and lower limit being 5 g/L or less.

The ammonium ion donor is not particularly limited, and, for example, ammonia, ammonium sulfate, ammonium chloride, ammonium carbonate, ammonium fluoride and the like can be used.

(Metal Compounds)

Compounds that include the objective metals are used as the supply sources of nickel, cobalt, aluminum and manganese, which are the component elements of the composite hydroxide of the present invention. The compounds used are preferably water-soluble compounds such as nitrates, sulfates, chlorides and the like. For example, nickel sulfate, manganese sulfate, cobalt sulfate, aluminum sulfate, sodium aluminate and the like are suitably used.

When aluminum is to be uniformly dispersed inside the composite hydroxide, preferably an aluminum compound is added to the mixed aqueous solution, or a separate aluminum aqueous solution is prepared and added to the reaction aqueous solution at the same time as the mixed aqueous solution. As a result, in addition to nickel, cobalt and manganese, aluminum can also be uniformly dispersed inside the reaction aqueous solution and coprecipitated out.

On the other hand, preferably water-soluble compounds are used for the additional elements (expressed as M in the compositional expression, with one or more elements selected from among the group Mg, Ca, Ti, V, Cr, Zr, Nb, Mo and W), for example, titanium sulfate, ammonium peroxotitanate, titanium potassium oxalate, vanadium sulfate, ammonium vanadate, chromium sulfate, potassium chromate, zirconium sulfate, zirconium nitrate, niobium oxalate, ammonium molybdate, sodium tungstate, ammonium tungstate and the like can be used. These additional elements, using the same methods as used for aluminum, can be dispersed into the composite hydroxide, or can be made to coat the surface of the composite hydroxide.

(Aluminum and Additional Element Coating)

In the present invention, when aluminum is not included in the metal compounds that are included in the nucleation aqueous solution or in the metal compounds that are supplied in the particle growth process, it is necessary to further provide a process for coating the composited hydroxide that is obtained in the particle growth process with an aluminum compound.

When coating an aluminum compound on the surface of a composite hydroxide in this way, the composite hydroxide is made into a slurry using an aqueous solution that includes, for example, sodium aluminate, and after control is performed so that the pH value becomes a specified value, by precipitating aluminum compound out on the surface of the composite hydroxide surface by a crystallization reaction, the surface of the composite hydroxide can be uniformly coated. In this case, instead of an aqueous solution that includes sodium aluminate, it is also possible to use an aluminum alkoxide solution. Furthermore, it is also possible to coat the surface of a composite hydroxide with an aluminum compound by spraying the composite hydroxide with an aqueous solution or slurry that includes an aluminum compound, and allowing that spray to dry. Moreover, it is also possible to perform coating using a method such as spraying and drying slurry in which composite hydroxide and a salt that includes aluminum have been suspended, or mixing composite hydroxide with a salt that includes aluminum using a solid-phase method.

It is also further possible to coat an aluminum compound on the surface of a composite hydroxide that includes aluminum, and in that case, by reducing the atomic ratio of the aluminum ions existing in the mixed aqueous solution by the amount to be coated, the atomic ratio can be made to match the atomic ratio of the metal ions of the composite hydroxide to be obtained. The process for coating the surfaces of the particles with an aluminum compound can also be performed on the particles after the composite hydroxide has been heated.

Moreover, the additional elements as well can be coated on the surface of the composite hydroxide using the same method as that used for aluminum, and in that case, can be performed at the same time as the aluminum compound coating process.

(Concentration of the Mixed Aqueous Solution)

The concentration of the mixed aqueous solution is preferably 1 mol/L to 2.2 mol/L for the total metal compounds. When the concentration of the mixed aqueous solution is less than 1 mol/L, the amount of crystallized substance in the reaction vessel decreases, so productivity decreases, which is not desirable. On the other hand, when the salt concentration of the mixed aqueous solution is greater than 2.2 mol/L, the concentration is greater than the saturation concentration at normal temperature, so there is the danger that crystal precipitation will occur again and clog the equipment piping.

It is also not absolutely necessary to supply the metal compounds into the reaction vessel as a mixed aqueous solution, and, for example, when using metal compounds that are generated by mixing and reaction of that compound, it is possible to individually adjust metal compound aqueous solutions so that the total concentration of all of the metal compound aqueous solutions are within the range described above, and then simultaneously supply each of the individual metal compound aqueous solutions into the reaction vessel at the specified ratios. In the description of the present invention, the mixed aqueous solution shall include metal compound aqueous solutions that are supplied individually.

Furthermore, the amount that a mixed aqueous solution or individual metal compound aqueous solutions is supplied into the reaction vessel is preferably such that at the instant that the crystallization reaction ends, the concentration of crystallized substance is about 30 g/L to 200 g/L. When the concentration of crystallized matter is less than 30 g/L, the aggregation of primary particles may be insufficient, and when the concentration is greater than 200 g/L, diffusion of the added mixed aqueous solution in the reaction vessel may not be sufficient, and deviation in the particle growth may occur.

(Reaction Liquid Temperature)

The temperature of the reaction liquid in the reaction vessel is preferably 20° C. or greater, and it is particularly preferred that the temperature be set to 20° C. to 60° C. When the temperature of the reaction liquid is less than 20° C., solubility will become low and nucleation will easily occur, making control difficult. On the other hand, when the temperature is greater than 60° C., volatilization of ammonia is promoted, so in order to maintain the specified ammonia concentration, an excess amount of ammonium ion donor must be added, which increases costs.

{Producing Equipment}

In the production method for producing composite hydroxide of the present invention, an apparatus is used that does not recover the generated substance until the reaction ends. For example, this apparatus may be a normally used batch reaction vessel in which a mixer is installed. By employing this kind of apparatus, a problem as in the case of a typical continuous crystallizer that recovers generated substance from overflow in which particles that are in the progress of being grown are recovered at the same time as the overflow liquid does not occur, so it is possible to obtain particles having a narrow particle size distribution and that have a uniform particle size.

Moreover, the reaction atmosphere must be controlled, so an apparatus, such as a sealed-type apparatus, is used that is capable of controlling the atmosphere. By using this kind of apparatus, together with being able to obtain a composite hydroxide having the structure described above, it is possible for the nucleation reaction and particle growth reaction to proceed uniformly, so it is possible to obtain particles having an excellent particle size distribution, or in other words, it is possible to obtain particles having a narrow particle size distribution range.

(2-1) Cathode Active Material for a Non-Aqueous Electrolyte Secondary Battery

The cathode active material of the present invention is a lithium nickel composite oxide that is expressed by the general formula (4): $Li_{1+u}Ni_xCo_yAl_zMn_tM_sO_2$ (where, $-0.05 \le u \le 0.20$, $x+y+z+t+s=1$, $0 \le y \le 0.3$, $0 < z \le 0.1$, $0.01 < t \le 0.05$, $0 \le s \le 0.05$, and M is selected from at least one kind of additional element that is selected from the group of Mg, Ca, Ti, V, Cr, Zr, Nb, Mo and W), and has a layered hexagonal crystal structure.

(Composition)

In the cathode active material of the present invention, 'u' indicates the excess amount of lithium, and is in a range of being no less than −0.05 and no greater then 0.20. When the excess amount of lithium 'u' is less than −0.05, the reaction resistance of the cathode in a non-aqueous electrolyte secondary battery that uses the obtained cathode active material becomes large, so the battery output becomes low. On the other hand, when the excess amount of lithium 'u' is greater than 0.20, the initial discharge capacity when the cathode active material above is used in a battery cathode decreases, and the reaction resistance of the cathode also increases. In order to reduce the reaction resistance of the cathode, preferably the excess amount of lithium is within a range of no less than 0.00 and no more than 0.15.

In the general formula, 'y' that indicates the cobalt content is within the range of being no less than 0 and no greater than 0.3, and is preferably within the range of being no less 0.1 and no greater than 0.2. Cobalt reserves are limited, so cobalt is expensive, and when 'y' is greater than 0.3, the cost increases, which is not desirable.

In the general formula, 'z' that indicates the aluminum content is within the range of being greater than 0 but no greater than 0.1, and preferably within the range of being no less then 0.02 and no greater than 0.08. When 'z' is greater than 0.1, there is a problem in that the battery capacity decreases.

Moreover, 't' that indicates the manganese content is within the range of being greater than 0.001 but no greater than 0.05, and preferably within the range of being no less than 0.01 and not greater than 0.03. When 't' is 0.001 or less, a sufficiently hollow structure is not obtained, and the battery output becomes low. On the other hand, when 't' is greater than 0.05, the discharge and charge capacity when used in the battery cathode decreases.

Furthermore, as expressed in general formula (4), it is further preferred that the cathode active material of the present invention be adjusted so that additional elements are included in the lithium nickel composite oxide. By including the additional elements above, it is possible to improve the durability and output characteristics of a battery that uses this lithium nickel composite oxide as the active cathode material.

Particularly, by uniformly distributing additional elements on the surface or inside the particles, the effects described above can be obtained for all of the particles, and together with being able to obtain the effects above by adding a small amount, it is also possible to suppress a decrease in capacity. Furthermore, in order to obtain the effects with smaller amount thereof, it is preferred that the concentration of the additional elements be higher on the particle surface than inside the particles.

In the general formula, 's' that indicates the content of the additional elements is within the range of being no less than 0 and no greater than 0.05, and is preferably in the range of being no less than 0.01 and no greater than 0.04. When the content of additional elements is greater than 0.05, metal elements that contribute to the Redox reaction decrease, so the battery capacity also decreases, which is not desirable.

(Average Particle Size)

The cathode active material of the present invention has an average particle size that is within the range of 2 μm to 15 μm. When the average particle size is less than 2 μm, the packing density of the particles when forming the cathode decreases, and thus the battery capacity per volume of the cathode decreases. On the other hand, when the average particle size is greater than 15 μm, the specific surface area of the cathode active material decreases and the boundary surface between the cathode and electrolyte decreases, so the cathode resistance increases and the battery output characteristic decreases.

In order to lower the cathode resistance and further improve the output characteristic, preferably the particle size of the cathode active material is made to be small, and the boundary surface with the electrolyte is increased. From this aspect, preferably the average particle size of the cathode active material is within the range of 3 μm to 8 μm, and more preferably within the range of 3 μm to 6 μm. By adjusting the average particle size of the cathode active material to be within such a range, together with being possible to increase the battery capacity per volume of the battery that uses this cathode active material in the cathode, it is also possible to obtain good battery characteristics such as excellent safety and high output.

(Particle Size Distribution)

Figure 6:
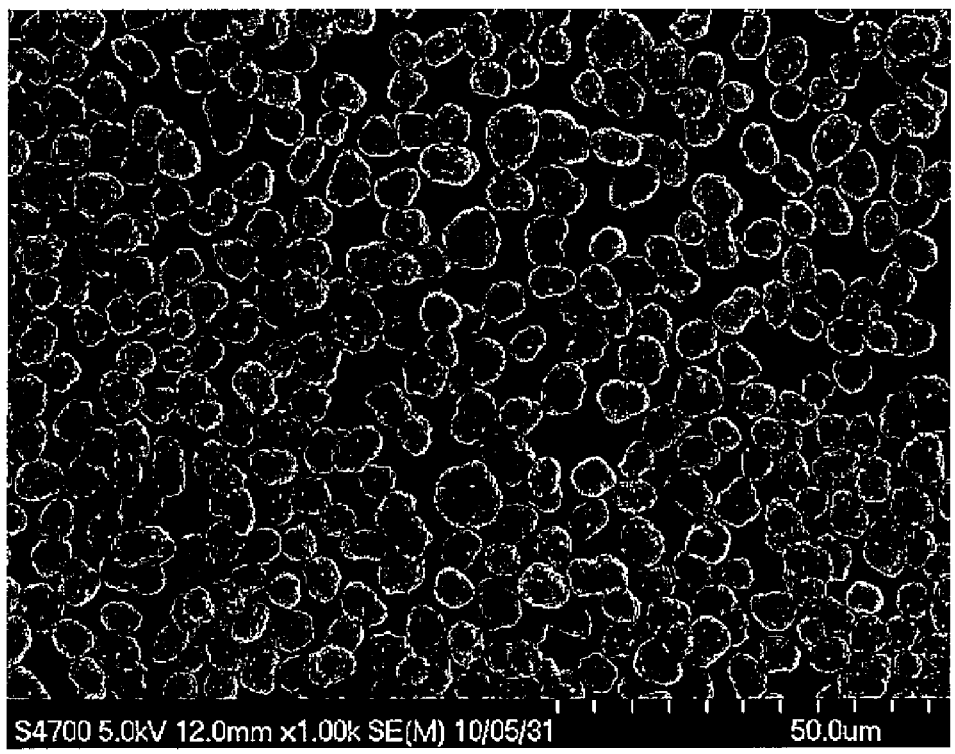
FIG. 6 is an SEM photograph (observation magnification rate: 1,000×) of lithium nickel composite oxide, which is the cathode active material of the present invention.

As illustrated in FIG. 6, the cathode active material of the present invention comprises secondary particles of a very highly homogenous lithium nickel composite oxide of which the index [(d90−d10)/average particle size] that indicates the spread of the particle size distribution is 0.60 or less, and the average particle size is 2 μm to 15 μm.

When the particle size distribution is in a large range, many minute particles having a very small particle size with respect to the average particle size and rough particles having a very large particle size with respect to the average particle size exist in the cathode active material. When a cathode is formed using cathode active material in which many minute particles exist, there is a possibility that localized reaction with the minute particles will occur and cause heat to be generated, and together with a decrease in safety, the minute particles selectively deteriorate, so the cycling characteristic becomes poor. On the other hand, when a cathode is formed using cathode active material in which there are many rough particles, there is insufficient reaction surface area between the electrolyte and the cathode active material, so the battery output decreases due to an increase in the reaction resistance.

Therefore, by controlling the particle size distribution of the cathode active material so that the index [(d90−d10)/average particle size] is 0.60 or less, and the average particle size is within the range 2 μm to 15 μm, the particle size is a suitable size, and the ratio of minute particles and rough particles can be decreased. Therefore, a battery in which this cathode active material is used in the cathode has excellent safety, a good cycle characteristic and good battery output. The same average particle size, d90 and d10 as used in the composite hydroxide described above can be used, and measurement can also be performed in the same way.

(Particle Structure)

Figure 7:
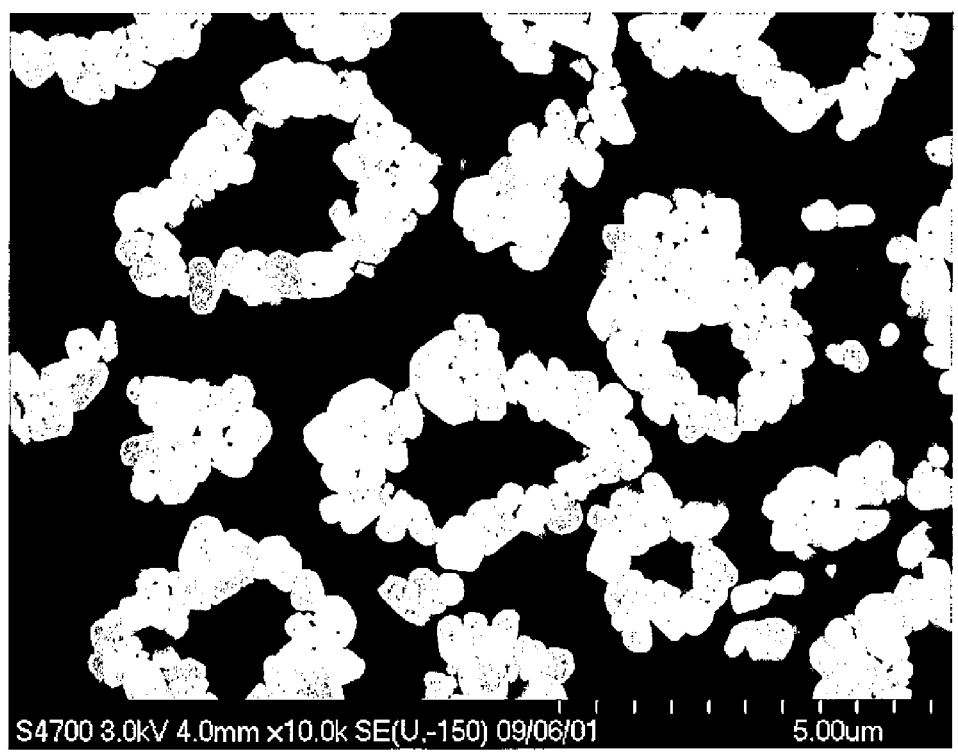
FIG. 7 is an SEM photograph (observation magnification rate: 10,000×) of lithium nickel composite oxide, which is the cathode active material of the present invention.

As illustrated in FIG. 7, a feature of the cathode active material of the present invention is having a hollow structure that comprises a center section inside secondary particles and an outer-shell section that is formed around the outside of the center section. By having this kind of hollow structure, it is possible to increase the reaction surface area, and electrolyte enters in from the particle boundaries or spaces between primary particles of the outer-shell section and insertion and removal of lithium is also performed at the reaction boundary surfaces of the primary particle surfaces on the hollow side inside the particles, so it is possible to increase the battery output characteristic without hindering movement of Li ions and electrons.

Here, the thickness of the outer-shell section is such that preferably the ratio with respect to the particle size of the secondary particles of the cathode active material is 5% to 35%. Particularly, by taking into consideration that the average particle size of secondary particles of the cathode active material of the present invention is within the range of 2 μm to 15 μm, preferably the thickness of the outer-shell section is within the range 0.5 μm to 5 μm, and more preferably within the range 0.5 μm to 2.5 μm. When the ratio of the thickness of the outer-shell section is less than 5%, the strength of the lithium nickel composite oxide of the cathode active material decreases, so when handling the powder or when used as a battery cathode, particles are damaged and minute particles occur, and thus the characteristics become poor. On the other hand, when the ratio of the thickness of the outer-shell section is greater than 35%, the electrolyte that can get inside the hollow space inside the particles or spaces between particles decreases, so the surface area that contributes to the battery reaction decreases, and thus the cathode resistance increases and the output characteristics decrease. In this case, the ratio of the thickness of the outer-shell section with respect to the particle size of the composite oxide can be found by using the same method as that used for the composite hydroxide described above.

(Characteristics)

The cathode active material of the present invention, when used in a cathode of a CR2032 coin battery, for example, is such that a high initial discharge capacity of 185 mAh/g or greater, a low cathode resistance and a high capacity maintenance rate after repeating charge and discharge cycle can be obtained, and this cathode active material displays excellent characteristic as the cathode active material for a non-aqueous electrolyte secondary battery.

(2-2) Production Method for a Cathode Active Material for a Non-Aqueous Electrolyte Secondary Battery The production method for producing the cathode active material of the present invention is a method for producing a cathode active material that is expressed by the general formula (4), and as long as it is possible to produce cathode active material so that the average particle size, particle structure and composition are as described above, the method is not particularly limited; however, it is definitely possible to produce the cathode active material by employing the method below, so the method is preferred.

The production method for producing cathode active material of the present invention includes: a) a heat treatment process for heat treating the composite hydroxide that will become the raw material of the cathode active material of the present invention; b) a mixing process for forming a mixture by mixing a lithium compound into the heat treated composite hydroxide or the obtained composite oxide after heat treatment; and c) a calcination process for performing calcination of the mixture that was formed in the mixing process. Each of the processes will be explained below.

a) Heat Treatment Process

The heat treatment process is a process of heating composite hydroxide to 105° C. to 750° C., and is performed in order to remove moisture content that is included in the composite hydroxide. By performing this heat treatment process, the moisture that remains in the particles until the calcination process can be reduced to a specific amount. As a result, it is possible to prevent fluctuation of the percentage of the number of metal atoms and number of lithium atoms in the cathode active material to be obtained.

The objective of performing the heat treatment process is to suppress fluctuation of the number of atom, so in the case where it is possible to suppress the fluctuation by strict and accurate mixing of raw material, this heat treatment process can be omitted.

In the heat treatment process, it is only necessary to remove enough moisture so that fluctuation of the ratio of metal atoms and number of lithium atoms in the cathode active material does not occur, so it is not absolutely necessary to convert all of the composite hydroxide to composite oxide. However, in order to further reduce fluctuation, preferably a heating temperature of 500° C. or greater is used, and all of the composite hydroxide is converted to composite oxide.

In the heat treatment process, when the heating temperature is less than 105° C., excess moisture in the composite hydroxide cannot be removed, and it is not possible to suppress the fluctuation described above. On the other hand, when the heating temperature is greater than 750° C., the particles are sintered due to the heating treatment process, and so a composite oxide having a uniform particle size cannot be obtained. From the aspect of suppressing this kind of fluctuation, preferably the metal content that is included in the composite hydroxide due to the heat treatment conditions is found in advance through analysis, and the ratio with the lithium compound is set.

The atmosphere in which this heat treatment process is performed is not particularly limited as long as the atmosphere is a non-reducing atmosphere, however, preferably is performed in an airflow atmosphere in which the process can be performed easily.

Moreover, the heat treatment process time is not particularly limited, however, when the time is less than one hour, there is a possibility that removal of the excess moisture in the composite hydroxide will not be performed sufficiently, so preferably the processing time is at least one hour or more, and more preferably is 5 hours to 15 hours.

The equipment that is used in the heat treatment process is not particularly limited as long as the composite hydroxide can be heated in a non-reducing atmosphere, preferably an airflow atmosphere, so an electric furnace that does not generate gas can be suitably used.

b) Mixing Process

The mixing process is a process for obtaining a lithium mixture by mixing the composite hydroxide that was heat-treated or the obtained composite oxide in the heat treatment process described above (hereafter, referred to as 'heat-treated particles') with a material that includes lithium such as a lithium compound. Here, heat-treated particles include not only the composite hydroxide from which the remaining moisture was removed in a heat treatment process, but also includes composite oxide that was converted to an oxide in a heat treatment process, or a combination of these.

The heat-treated particles and the lithium compound are mixed so that the ratio of the number of atoms of the metals other than lithium in the lithium mixture, in other words, the sum of the number of atoms nickel, manganese, cobalt and aluminum (Me), and the number of atoms of lithium (Li) (Li/Me) is 0.95 to 1.2, and preferably 1 to 1.15. That is, the ratio Li/Me does not change before and after the calcination process, so the Li/Me ratio during mixing in this mixing process becomes the Li/Me ratio of the cathode active material, and thus mixing is performed so that the Li/Me ratio of the lithium mixture becomes the same as the Li/Me ratio of the cathode active material to be obtained.

In this mixing process, preferably the heat-treated particles and the lithium compound are sufficiently mixed so that they are uniformly dispersed. When mixing is insufficient, there is a possibility that a problem will occur in that there will be fluctuation in the Li/Me ratio between individual particles, and sufficient battery characteristics will not be obtained.

A typical mixer can be used for mixing, for example, a shaker mixer, a Loedige mixer, a Julia mixer, a V blender or the like can be used, and mixing should be performed so that the heat-treated particles and lithium-containing material are sufficiently mixed without damaging the structure of the particles.

The lithium compound that is used for forming the lithium mixture is not particularly limited, however, from the aspect of ease of procurement, preferably, lithium hydroxide, lithium nitrate, lithium carbonate or a mixture of these is used. Particularly, taking into consideration ease of handling and product stability, preferably lithium hydroxide is used.

c) Calcination Process

The calcination process is a process in which the lithium mixture that was obtained in the mixing process undergoes calcination to form a lithium nickel composite oxide. By performing calcination of the lithium mixture in the calcination process, the lithium in the lithium-containing matter is dispersed into the heat-treated particles, and lithium nickel composite oxide is formed.

(Calcination Temperature)

Calcination of the lithium mixture is performed at 650° C. to 800° C., and preferably at 700° C. to 800° C., and even more preferably at 740° C. to 770° C.

When the calcination temperature is less than 650° C., dispersion of lithium into the heat-treated particles is not performed sufficiently, so excess lithium and un-reacted particles remain, the crystal structure is not sufficiently formed, and when used in a battery, sufficient battery characteristics are not obtained.

Moreover, when the calcination temperature exceeds 800° C., there is severe sintering between the secondary particles of the composite oxide, and there is a possibility that abnormal particle growth will occur, and as a result, there is a possibility that sintered particles will become rough and that the particle shape (spherical secondary particle shape) will not be able to be maintained. The specific surface area of this kind of cathode active material decreases, so when used in a battery, a problem occurs in that the cathode resistance increases and the battery capacity decreases. There is also a possibility that cationic mixing of the lithium and metal elements will occur, the crystal structure will become distorted and the battery capacity will decrease.

From the aspect of uniformly performing the reaction between the heat-treated particles and the lithium compound, it is preferred that the temperature be increased to the temperature described above at a rate of temperature increase of 3° C./min to 10° C./min. Furthermore, by maintaining the temperature for about 1 to 5 hours at a temperature near the melting point of the lithium compound, the reaction can be performed more uniformly.

(Calcination Time)

Of the calcination time, the time during which the temperature is maintained at the calcination temperature is preferably at least 2 hours or more, and more preferably, 4 hours to 24 hours. When the time is less than 2 hours, there is a possibility that the generation of lithium nickel composite oxide will not be performed sufficiently.

The time is not particularly limited, however, in order to prevent deterioration of the sagger after the maintenance time has ended, the atmosphere is cooled to 200° C. or less at a lowering rate of 2° C./min to 10° C./min.

(Pre-Calcination)

Particularly, in the case of using lithium hydroxide or lithium carbonate as the lithium compound, preferably pre-calcination is performed before calcination by maintaining the temperature at a temperature lower than the calcination temperature, or more specifically, at a temperature of 100° C. to 500° C. for 1 hour to 10 hours. In other words, preferably pre-calcination is performed at the reaction temperature of lithium hydroxide or lithium carbonate and the heat-treated particles. In this case, by maintaining the temperature at a temperature near the reaction temperature of lithium hydroxide or lithium carbonate, lithium is sufficiently dispersed into the heat-treated particles, and a uniform lithium nickel composite oxide can be obtained.

(Calcination Atmosphere)

The atmosphere during calcination is preferably an oxidizing atmosphere, and the oxygen concentration is preferably in the range of 18% to 100% by volume, and it is further preferred that the atmosphere be a mixed atmosphere of oxygen and an inert gas having the concentration above. Particularly, when taking into consideration the battery characteristics, preferably calcination is performed in an oxygen flow atmosphere. In other words, calcination is preferably performed in an air or oxygen flow. When the oxygen concentration is less than 18% by volume, there is a possibility that the crystallinity of the lithium nickel composite oxide will be insufficient.

The furnace used for calcination is not particularly limited as long as it is possible to heat the lithium mixture in an air or oxygen flow, however, from the aspect of maintaining a uniform atmosphere inside the furnace, an electric furnace that does not generate gas is preferred, and it is possible to use either a batch heating furnace or continuous heating furnace.

(Crushing)

There is a possibility that lithium nickel composite oxide that was obtained from calcination may undergo aggregation or a small amount of sintering. In that case, it is preferred that the lithium nickel composite oxide be crushed. As a result, it is possible to obtain lithium nickel composite oxide, or in other words, the cathode active material of the present invention. Crushing is an operation of loosening up the aggregate of plural secondary particles that occurred due to sintering necking between secondary particles during calcination by applying mechanical energy to the aggregate and separating the secondary particles without hardly any damage to the secondary particles themselves.

(3) Non-Aqueous Electrolyte Secondary Battery

The non-aqueous electrolyte secondary battery of the present invention employs a cathode that uses the cathode active material for a non-aqueous electrolyte secondary battery described above for the cathode material, and in the following, the construction of the non-aqueous electrolyte secondary battery of the present invention will be explained.

Except for using the cathode active material of the present invention for the cathode material, the non-aqueous electrolyte secondary battery of the present invention comprises essentially the same construction as a typical non-aqueous electrolyte secondary battery.

For example, the secondary battery of the present invention has construction that comprises a case, and a cathode, anode, non-aqueous electrolyte and a separator that are housed inside the case. More specifically, the secondary battery of the present invention is formed by forming an electrode body by layering the cathode and anode by way of a separator, then impregnating non-aqueous electrolyte into the electrode body, using collector leads or the like to respectively connect between a cathode current collector of the cathode and a cathode terminal that communicates with the outside, and between an anode current collector of the anode and an anode terminal that communicates with the outside, and sealing the case.

Needless to say, the construction of the secondary battery of the present invention is not limited to the example given above, and it is possible to use various shapes such as the cylindrical shape, layered shape or the like for the external shape.

(Cathode)

First, the cathode, which is a feature of the secondary battery of the present invention, will be explained. The cathode is a seat member and is formed by coating and drying a cathode mixture paste that includes the cathode active material of the present invention on the surface of the cathode collector that is made, for example, using aluminum foil.

The cathode is suitably processed according to the battery to be used. For example, processing such as a cutting process for forming the cathode to a suitable size to correspond to the target battery, a pressurizing compression process by a roll press or the like in order to increase the electrode density, and the like are performed.

The cathode mixture paste is formed by adding a solvent to a cathode mixture and then mixing and kneading. The cathode mixture is formed by mixing the powdered cathode active material of the present invention with conductive material and a binding agent.

The conductive material is added in order to give the electrode suitable electric conductivity. This conductive material is not particularly limited, and it is possible to use, for example, graphite (natural graphite, synthetic graphite, expanded graphite and the like), or a carbon black material such as acetylene black, Ketjen black and the like.

The binding agent serves the role of binding together the particles of the cathode active material. The binding agent that is used for this cathode mixture is not particularly limited, and, for example, it is possible to use polyvinylidene fluoride (PVDF), polytetrafluoroethylene (PTFE), fluororubber, ethylene propylene diene rubber, styrene-butadiene, cellulose resin, polyacrylic acid and the like.

It is also possible to add activated carbon to the cathode mixture, and by adding activated carbon, it is possible to increase the electric double layer capacity of the cathode.

The solvent is used for dissolving the binding agent and dispersing the conductive material and activated carbon into the binding agent. This solvent is not particularly limited, and for example, it is possible to use an organic solvent such as N-methyl-2-pyrrolidone or the like.

Moreover, the mixture ratio of each of the substances in the cathode mixture paste is not particularly limited. For example, when the solid content of the cathode mixture except for the solvent is taken to be 100 parts by mass, then as in the cathode of a typical non-aqueous electrolyte secondary battery, the content of the cathode active material can be 60 to 90 parts by mass, the content of the conductive material can be 1 to 20 parts by mass, and the content of the binding agent can be 1 to 20 parts by mass.

(Anode)

The anode is a seat member that is formed by coating and drying an anode mixture paste on the surface of an anode collector made using a metal foil such as copper foil. This anode is essentially formed by the same method as the cathode, however the components and combination thereof of the anode mixture paste, and material of the collector are different; and the anode, as in the case of the cathode, undergoes various processing as necessary.

The anode mixture paste is formed into a paste by adding a suitable solvent to the anode mixture that is formed by mixing anode active material and binding agent.

For the anode active material, it is possible to use a lithium-containing material such as metallic lithium or a lithium alloy, or an occlusion material that is capable of occluding or releasing lithium ions.

The occlusion material is not particularly limited, and it is possible to use, for example, an organic compound fired body such as natural graphite, synthetic graphite, phenol resin or the like, and a powdered carbon material such as coke. When this kind of occlusion material is used as the anode active material, as in the case of the cathode, it is possible to use a fluororesin such as PVDF as a binding agent, and to use an organic solvent such as N-methyl-2-pyrrolidone as a solvent for causing the anode active material to disperse into the binding agent.
(Separator)

The separator is arranged between the cathode and the anode, and has the function of separating the cathode and anode, and supporting the electrolyte. For this kind of separator, it is possible to use, for example, a thin film such as a thin polyethylene or polypropylene film that has many micropores, however as long as the separator has the function described above, the separator is not particularly limited.
(Non-Aqueous Electrolyte)

The non-aqueous electrolyte is for dissolving the lithium salt that is used as a supporting salt in the organic solvent.

As the organic solvent, it is possible to use one type alone or a mixture of two types or more selected from a cyclic carbonate such as ethylene carbonate, propylene carbonate, butylene carbonate, trifluoro propylene carbonate and the like; moreover, a linear polycarbonate such as diethyl carbonate, dimethyl carbonate, ethyl methyl carbonate, dipropyl carbonate, and the like; furthermore, an ether compound such as tetrahydrofuran, 2-methyltetrahydrofuran, dimethoxyethane and the like; a sulfur compound such as ethyl methyl sulfone, butanesultone and the like; and a phosphorous compound such as triethyl phosphate, trioctyl phosphate and the like.

As a supporting salt, it is possible to use $LiPF_6$, $LiBF_4$, $LiClO_4$, $LiAsF_6$, $LiN(CF_3SO_2)_2$ and composite salts of these.

The non-aqueous electrolyte, in order to improve the battery characteristics, may also include a radical scavenger, a surfactant, a flame retardant, and the like.
(Characteristics of the Non-Aqueous Electrolyte Secondary Battery of the Present Invention)

The non-aqueous electrolyte secondary battery of the present invention has a cathode that is constructed as described above and that uses the cathode active material of the present invention, so in the case of a CR2032 coin battery of examples that will be described later, it is possible to obtain a high initial discharge capacity of 185 mAh/g or greater, and a cathode resistance of 6Ω or less, and thus the battery has a high capacity and high output. When compared with conventional cathode active material using lithium nickel oxide, the heat stability is also high and safety is excellent.
(Applications for the Secondary Battery of the Present Invention)

The secondary battery of the present invention having the characteristics described above is suitable as the power source for compact mobile devices (notebook personal computers, mobile telephone terminals and the like) that require high capacity.

Moreover, the secondary battery of the present invention is also suitable as the power source for driving a motor that requires high output. As batteries become larger, it becomes difficult to maintain stability, and expensive protective circuits are necessary and essential, however, the secondary battery of the present invention has excellent stability, so not only does maintaining stability become easier, but it is also possible to simplify and lower the cost of expensive protective circuitry. Making the battery more compact and increasing the output is also possible, so the battery is also suitable as the power source for transport equipment having restricted installation space.

EXAMPLES

Example 1

Producing Composite Hydroxide

Composite hydroxide was produced as described below. In all of the examples, unless otherwise stated, samples using special grade chemicals manufactured by Wako Pure Chemical Industries, Ltd. were used for producing the composite hydroxide, cathode active material and secondary battery.
(Nucleation Process)

First, water was put into a reaction vessel (34 L) until half the vessel was filled, then while stirring, the temperature inside the vessel was set to 40° C. During this time, the reaction vessel was in an air atmosphere (oxygen concentration: 21% by volume). Then, 25% by mass of sodium hydroxide aqueous solution, and 25% by mass of ammonia aqueous solution were added to the water in the reaction vessel, and at a reference liquid temperature of 25° C., the pH value of the reaction liquid inside the vessel was adjusted to 13.0. Furthermore, the ammonia concentration inside the reaction liquid was adjusted to 15 g/L, to form the aqueous solution before reaction.

Next, nickel sulfate, cobalt sulfate and manganese sulfate were dissolved in water to prepare a 2.0 mol/L mixed aqueous solution. This mixed aqueous solution was adjusted so that the mole ratio of the metal elements was Ni:Co:Mn=1:1:1 (Al=0).

This mixed aqueous solution was added to the aqueous solution before reaction inside the reaction vessel at a ratio of 88 ml/min to form the reaction aqueous solution. At the same time, 25% by mass of ammonia aqueous solution and 25% by mass of sodium hydroxide aqueous solution were also added at a ratio of 50 ml/min to the reaction aqueous solution, and while keeping the ammonia concentration in the reaction aqueous solution (nucleation aqueous solution) at the value described above, and performing control to keep the pH value at 13.0 (nucleation pH value), and nucleation was performed.
(Particle Growth Process)

After the nucleation process ended, 35% by mass of sulfuric acid was added until the pH value of the reaction aqueous solution reached 11.6 at a reference liquid temperature of 25° C., and after the pH value of the reaction aqueous solution reached 11.6, the supply of 25% by mass of sodium hydroxide aqueous solution to the reaction aqueous solution (particle growth aqueous solution) was started again, and with the pH value being controlled at 11.6 at a reference liquid temperature of 25° C., after particle growth was performed by continuously performing crystallization for 15 minutes, the supply of liquid was temporarily stopped, and nitrogen gas was allowed to flow at a rate of 5 L/min until the oxygen concentration in the space inside the reaction vessel became 0.2% by volume or less.

Next, nickel sulfate and cobalt sulfate were dissolved in water to form a 2.0 mol/L nickel cobalt mixed aqueous solution. In this mixed aqueous solution, the mole ratio of the metal elements was adjusted to be Ni:Co=82:15. A liquid volume of 9,240 ml of the mixed aqueous solution above was prepared so that the mixed aqueous solution could be supplied for 105 minutes at a rate of 88 ml/min. Moreover, sodium aluminate was dissolved in water to form a 0.6 mol/L aluminum-containing aqueous solution. A liquid volume of 924 ml of the aluminum-containing aqueous solution was prepared so that this aluminum-containing aqueous solution could be supplied for 105 minutes at a rate of 8.8 ml/min. After that, the supply of nickel cobalt solution at a rate of 88 ml/min, and the supply of the aluminum-containing aqueous solution at a rate of 8.8 ml/min was started again, and crystallization was performed for 105 minutes.

When the reaction vessel became full, together with stopping crystallization, stirring was stopped and the liquid was left to rest, which promoted precipitation of the generated product. After that, half of the supernatant liquid was removed from the reaction vessel. Furthermore, a liquid volume of 10,560 ml of the nickel cobalt solution above was prepared so that the nickel cobalt solution could be supplied for 120 minutes at a rate of 88 ml/min. Moreover, a liquid volume of 1,056 ml of the aluminum-containing aqueous solution was prepared so that the aluminum-containing aqueous solution could be supplied for 120 minutes at a rate of 8.8 ml/min. After that, the supply of nickel cobalt solution at a rate of 88 ml/min, and the supply of aluminum-containing aqueous solution at a rate of 8.8 ml/min was restarted, and after crystallization was performed for 2 hours (total of 4 hours), crystallization was ended.

The obtained generated product was then washed, filtered and dried to obtain a composite hydroxide.

In Example 1, switching from an air atmosphere to a nitrogen atmosphere was performed when the time elapsed from the start of the particle growth process reached 6.25% of the total time of the particle growth process. Moreover, during the crystallization above, the pH value was controlled by adjusting the amount of the supply flow of the sodium hydroxide aqueous solution by using a pH controller, and the fluctuation width was kept within a range of ±0.2 of the set value.

[Analysis of the Composite Hydroxide]

After a sample of the obtained composite hydroxide was dissolved by an inorganic acid, chemical analysis was performed by the ICP atomic emission spectrometry method, and it was found that the composition was $Ni_{0.79}Co_{0.16}Al_{0.03}Mn_{0.02}(OH)_{2+a}$ ($0 \leq a \leq 0.5$).

Moreover, the average particle size and the index value [(d90−d10)/average particle size] that indicates the particle size distribution of this composite hydroxide were found by calculation from the volume integral value that was measured using a laser diffraction-scattering particle size distribution measuring device (Microtrac HRA, manufactured by Nikkiso Co., Ltd.). As a result, the average particle size was 4.8 μm, and [(d90−d10)/average particle size] was 0.49.

Next, SEM (Scanning Electron Microscope S-4700, manufactured by Hitachi High Technologies Corporation) observation (magnification rate: 1,000×) was performed for the obtained composite hydroxide, and it was confirmed that the composite hydroxide had a spherical shape, and that the particle size was mostly uniform. The SEM observation results are given in FIG. 4.

Moreover, a sample of the obtained composite hydroxide was embedded in resin, and cross-section polishing was performed, and as a result of performing SEM observation at a magnification rate of 10,000× it was confirmed that this composite hydroxide comprised secondary particles, and those secondary particles comprised a center section comprising thin flake shaped minute primary particles (particle size of approximately 0.3 μm), and an outer-shell section around the outside of the center section comprising plate shaped primary particles having a particle size (approximately 0.6 μm) that is larger than the minute primary particles of the center section. The results of the SEM observation of the cross section are illustrated in FIG. 5. It was found from the SEM observation of this cross section that the thickness of the outer-shell section with respect to the particle size of the secondary particles was 11%.

[Producing Cathode Active Material]

Heat treatment of the composite hydroxide above was performed for 6 hours at 700° C. in a flow of air (oxygen: 21% by volume) to convert the composite hydroxide to a composite oxide, and the composite oxide was recovered.

Lithium hydroxide was weighed so that Li/Me=1.06, and a lithium mixture was prepared by mixing the lithium hydroxide with the composite oxide above. The mixing was performed using a shaker mixer (TURBULA Type T2C, manufactured by Wille et Backofen Corporation (WAB)).

After pre-calcination of the obtained lithium mixture was performed for 9 hours at 500° C. in air (oxygen: 21% by volume), calcination was performed for 12 hours at 760° C., then the lithium mixture was cooled and crushed to obtain a cathode active material.

[Analysis of the Cathode Active Material]

Using the same method that was used for the composite hydroxide, the particle size distribution of the cathode active material that was obtained was measured, and the average particle size was 4.4 μm, and the value for [(d90−d10)/average particle size] was 0.43.

Moreover, using the same method that was used for the composite hydroxide, SEM observation and cross-sectional SEM observation of the cathode active material was performed, and it was confirmed that the obtained cathode active material was spherical and that the particle size was mostly uniform. The SEM observation results for this cathode active material are given in FIG. 6. On the other hand, from cross-sectional SEM observation, it was confirmed that this cathode active material had a hollow structure that comprised an outer-shell section comprising sintered primary particles, and a hollow section on the inside of the outer-shell section. The results of this cross-sectional SEM observation are given in Table 7. From this observation, it was found that the percentage of the thickness of the outer-shell section with respect to the particle size of the cathode active material was 12%.

The specific surface area of the obtained cathode active material was found by using a flowing gas adsorption method specific surface area measurement device (Multisorb, manufactured by Yuasa-Ionics) to be 1.3 m$^2$/g.

Moreover, the obtained cathode active material was analyzed by powder X-ray diffraction using Cu—Kα rays by an X-ray diffraction device (X'Pert PRO, manufactured by PANalytical), and it was confirmed that the crystal structure of the cathode active material was a single-phase hexagonal layered crystal structure of the composite oxide.

Furthermore, similarly, the composition of the cathode active material was analyzed by ICP atomic emission spectrometry, it was confirmed that the composition was $Li_{1.06}Ni_{0.79}Co_{0.16}Al_{0.03}Mn_{0.02}O_2$.

[Producing a Secondary Battery]

Figure 8:
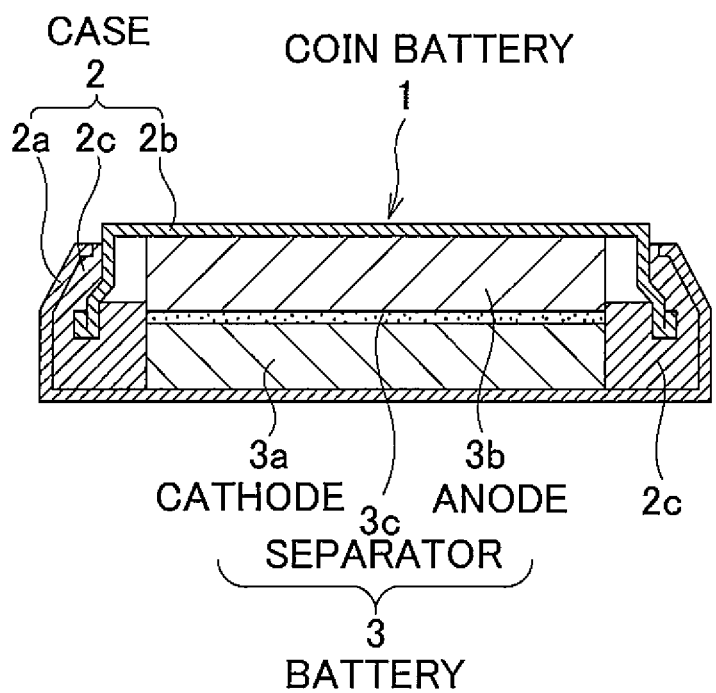
FIG. 8 is a cross-sectional view of a coin-type battery that was used for battery evaluation.

In order for evaluation of the obtained cathode active material, a CR2032 coin battery was used. As illustrated in FIG. 8, the coin battery 1 comprises a case 2 and an electrode 3 that is housed inside the case 2.

The case 2 has a cathode can 2a that is hollow and open on one end, and an anode can 2b that is arranged in the opening of the cathode can 2a, and when the anode can 2b is arranged in the opening of the cathode can 2a, a space is formed between the anode can 2b and the cathode can 2a where the electrode 3 is housed.

The electrode 3 comprises a cathode 3a, a separator 3c and an anode 3b that are layered in this order; and is housed inside the case 2 so that the cathode 3a comes in contact with the inner surface of the cathode can 2a, and the anode 3b comes in contact with the inner surface of the anode can 2b.

The case 2 comprises a gasket 2c, and this gasket 2c is fastened so that an insulating state is maintained between the cathode can 2a and the anode can 2b. Moreover, the gasket 2c also has a function of sealing between the inside of the case 2 and the outside so as to be airtight and liquid tight by sealing the space between the cathode can 2a and the anode can 2b.

This coin battery 1 was manufactured as described below. First, 52.5 mg of the obtained cathode active material, 15 mg of acetylene black and 7.5 mg of polytetra fluoro ethylene resin (PTFE) were mixed and pressed at a pressure of 100 MPa to a diameter of 11 mm and thickness of 100 µm to produce the cathode 3a. The produced cathode 3a was then dried for 12 hours at 120° C. in a vacuum drier. Using this cathode 3a, the anode 3b, the separator 3c and electrolyte, the coin battery 1 was manufactured inside a glove box having an Ar atmosphere for which the dew point was managed at −80° C.

An anode sheet that was punched into a disk shape having a diameter of 14 mm and formed by coating graphite powder having an average particle size of 20 µm and polyvinylidene fluoride on a copper foil was used as the anode 3b. Porous polyethylene film having a film thickness of 25 µm was used as the separator 3c. As an electrolyte solution, a mixed solution of equal amounts of ethylene carbonate (EC) and diethyl carbonate (DEC) (manufactured by Tomiyama Pure Chemical Industries, Ltd.) in which $LiClO_4$ was used as a supporting electrolyte.

[Battery Evaluation]

The initial discharge capacity and the cathode resistance, which are used for evaluating the performance of the obtained coin battery 1, were defined as described below.

The initial discharge capacity was used as a scale for measuring the discharge and charge capacity. The initial discharge capacity is defined as a capacity when after the open circuit voltage (OCV) becomes stable when the coin battery 1 is left for 24 hours after production, the battery is charged to the cutoff voltage of 4.8 V with the current density in the cathode being 0.1 $mA/cm^2$, and then after resting for 1 hour, the battery is discharged to a cutoff voltage of 2.5 V.

Figure 9:
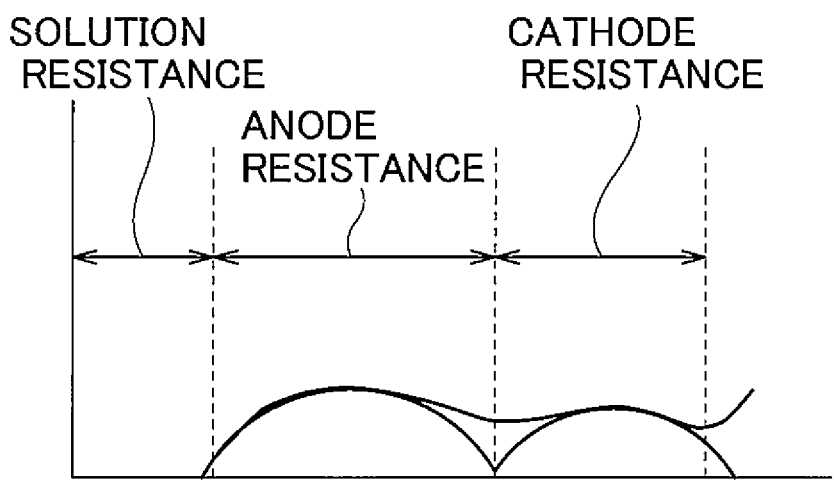
FIG. 9 is a drawing for explaining a measurement example in impedance evaluation, and an equivalent circuit that was used in analysis.
Figure 9:
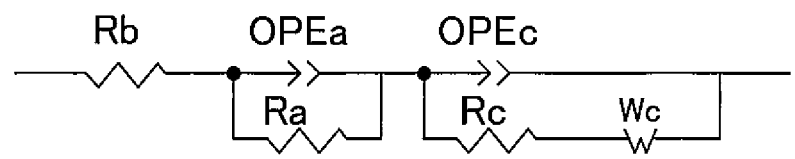

The cathode resistance was evaluated as described below. When the coin battery 1 was charged with a charging potential of 4.1 V, a frequency response analyzer and potentiostat/galvanostat (1255B, manufactured by Solartron) was used to measure the cathode resistance by an alternating current impedance method, and the Nyquist plot illustrated in FIG. 9 was obtained. This Nyquist plot represented the sum of characteristic curves that indicates the solution resistance, the anode resistance and capacity thereof, and the cathode resistance and capacity thereof, so a fitting calculation was performed using an equivalent circuit based on this Nyquist plot and the value of the cathode resistance was calculated.

Battery evaluation was performed for the coin battery having a cathode that was formed using the cathode active material described above, and the initial discharge capacity was 196.5 mAh/g, and the cathode resistance was 3.8Ω.

The characteristics of the composite hydroxide that was obtained in this example are given in Table 1, and the characteristics of the cathode active material, and the evaluation of a coin battery that was manufactured using this cathode active material are given in Table 2. Similar contents for Examples 2 to 5 and Comparative Examples 1 to 5 that will be described below are also given in Table 1 and Table 2.

Example 2

Except for switching from an air atmosphere to a nitrogen atmosphere, and switching the raw solution in the particle growth process of the production process for producing composite hydroxide at a time 4.2% from the start with respect to the total time of the particle growth process, the cathode active material for a non-aqueous electrolyte secondary battery was obtained and evaluated in the same way as in example 1. The compositions of the obtained composite hydroxide and cathode active material were $Ni_{0.80}Co_{0.16}Al_{0.03}Mn_{0.01}(OH)_{2+a}$ (0≤a≤0.5) and $Li_{1.06}Ni_{0.80}Cu_{0.16}Al_{0.03}Mn_{0.01}O_2$, respectively, and the composite hydroxide, as in the case of Example 1, comprised a center section comprising needle shaped and thin flake shaped minute primary particles (particle size of approximately 0.3 µm), and an outer-shell section around the outside of the center section comprising plate shaped primary particles that are larger than the minute primary particles of the center section (particle size of 0.7 µm).

Battery evaluation was performed for a coin battery having a cathode that was formed using the cathode active material described above, and the initial discharge capacity was 198.3 mAh/g, and the cathode resistance was 4.8Ω.

Example 3

Except for switching from an air atmosphere to a nitrogen atmosphere, and switching the raw solution in the particle growth process of the production process for producing composite hydroxide at a time 2.1% from the start with respect to the total time of the particle growth process, the cathode active material for a non-aqueous electrolyte secondary battery was obtained and evaluated in the same way as in Example 1. The compositions of the obtained composite hydroxide and cathode active material were $Ni_{0.81}Co_{0.15}Al_{0.03}Mn_{0.01}(OH)_{2+a}$ (0≤a≤0.5) and $Li_{1.06}Ni_{0.81}Co_{0.15}Al_{0.03}Mn_{0.01}O_2$, respectively, and the composite hydroxide, as in the case of Example 1, comprised a center section comprising needle shaped and thin flake shaped minute primary particles (particle size of approximately 0.3 µm), and an outer-shell section around the outside of the center section comprising plate shaped primary particles that are larger than the minute primary particles of the center section (particle size of 0.8 µm).

Battery evaluation was performed for a coin battery having a cathode that was formed using the cathode active material described above, and the initial discharge capacity was 201.4 mAh/g, and the cathode resistance was 5.2Ω.

Example 4

Except for not adding aluminum in the production process for producing composite hydroxide, and adding aluminum to the obtained hydroxide by coating the surface with an aluminum compound using a coating method that uses sodium aluminate so that t=0.03 in the general formula (1), the cathode active material for a non-aqueous electrolyte secondary battery was obtained and evaluated in the same way as in Example 1. The compositions of the obtained composite hydroxide and cathode active material were $Ni_{0.79}Co_{0.16}Al_{0.03}Mn_{0.02}(OH)_{2+a}$ (0≤a≤0.5) and $Li_{1.06}Ni_{0.79}Co_{0.16}Al_{0.03}Mn_{0.02}O_2$, respectively, and the composite hydroxide, as in the case of Example 1, comprised a center section comprising needle shaped and thin flake shaped minute primary particles (particle size of approximately 0.3 µm), and an outer-shell section around the outside of the center section comprising plate shaped primary particles that were larger than the minute primary particles of the center section (particle size of 0.8 μm).

Battery evaluation was performed for a coin battery having a cathode that was formed using the cathode active material described above, and the initial discharge capacity was 196.0 mAh/g, and the cathode resistance was 4.0Ω.

Example 5

Except for switching from an air atmosphere to a nitrogen atmosphere in the particle growth process of the production process for producing composite hydroxide at 20 minutes from the start of the particle growth process, or in other words, at a time 8.3% from the start with respect to the total time of the particle growth process, the cathode active material for a non-aqueous electrolyte secondary battery was obtained and evaluated in the same way as in Example 1. The compositions of the obtained composite hydroxide and cathode active material were $Ni_{0.78}Co_{0.17}Al_{0.03}Mn_{0.03}(OH)_{2+a}$ ($0 \le a \le 0.5$) and $Li_{1.05}Ni_{0.78}Co_{0.17}Al_{0.03}Mn_{0.03}O_2$, respectively, and the composite hydroxide, as in the case of Example 1, comprised a center section comprising needle shaped and thin flake shaped minute primary particles (particle size of approximately 0.3 μm), and an outer-shell section around the outside of the center section comprising plate shaped primary particles that are larger than the minute primary particles of the center section (particle size of 0.5 μm).

Battery evaluation was performed for a coin battery having a cathode that was formed using the cathode active material described above, and the initial discharge capacity was 188.1 mAh/g, and the cathode resistance was 4.0Ω.

Example 6

Except for switching from an air atmosphere to a nitrogen atmosphere in the particle growth process of the production process for producing composite hydroxide at 20 minutes from the start of the particle growth process, and for the crystallization time being a total of 8 hours, the cathode active material for a non-aqueous electrolyte secondary battery was obtained and evaluated in the same way as in Example 1. Removal of the supernatant liquid during the particle growth process from the reaction vessel was performed every 2 hours. Moreover, in Example 6, switching from an air atmosphere to a nitrogen atmosphere was performed at a time 4.2% from the start with respect to the total time of the particle growth process.

The compositions of the obtained composite hydroxide and cathode active material were $Ni_{0.80}Co_{0.16}Al_{0.03}Mn_{0.01}(OH)_{2+a}$ ($0 \le a \le 0.5$) and $Li_{1.06}Ni_{0.80}Co_{0.16}Al_{0.03}Mn_{0.01}O_2$, respectively, and the composite hydroxide, as in the case of Example 1, comprised a center section comprising needle shaped and thin flake shaped minute primary particles (particle size of approximately 0.3 μm), and an outer-shell section around the outside of the center section comprising plate shaped primary particles that are larger than the minute primary particles of the center section (particle size of 0.6 μm).

Battery evaluation was performed for a coin battery having a cathode that was formed using the cathode active material described above, and the initial discharge capacity was 185.2 mAh/g, and the cathode resistance was 4.3Ω.

Comparative Example 1

Except for switching from an air atmosphere to a nitrogen atmosphere in the particle growth process of the production process for producing composite hydroxide at 35 minutes from the start of the particle growth process, or in other words, at a time 16.6% from the start with respect to the total time of the particle growth process, the cathode active material for a non-aqueous electrolyte secondary battery was obtained and evaluated in the same way as in Example 1. The compositions of the obtained composite hydroxide and cathode active material were $Ni_{0.75}Co_{0.18}Al_{0.03}Mn_{0.05}(OH)_{2+a}$ ($0 \le a \le 0.5$) and $Li_{0.06}Ni_{0.75}Co_{0.18}Al_{0.03}Mn_{0.05}O_2$, respectively, and the composite hydroxide, as in the case of Example 1, comprised a center section comprising needle shaped minute primary particles (particle size of approximately 0.3 μm), and an outer-shell section around the outside of the center section comprising plate shaped primary particles that are larger than the minute primary particles of the center section (particle size of 0.5 μm). On the other hand, for the cathode active material, damage and sintering of the particles occurred in the production process, so evaluation after that was stopped.

Comparative Example 2

Except for adjusting the mole ratio of the metal elements in the mixed aqueous solution that is used in the nucleation process so as to be Ni:Co:Mn=1:1:8, and switching from an air atmosphere to a nitrogen atmosphere in the particle growth process of the production process for producing composite hydroxide at 30 minutes from the start of the particle growth process, or in other words, at a time 12.5% from the start with respect to the total time of the particle growth process, the cathode active material for a non-aqueous electrolyte secondary battery was obtained and evaluated in the same way as in Example 1. The compositions of the obtained composite hydroxide and cathode active material were $Ni_{0.73}Co_{0.14}Al_{0.03}Mn_{0.10}(OH)_{2+a}$ ($0 \le a \le 0.5$) and $Li_{1.08}Ni_{0.73}Co_{0.14}Al_{0.03}Mn_{0.10}O_2$, respectively, and the composite hydroxide, as in the case of Example 4, comprised a center section comprising needle shaped minute primary particles (particle size of approximately 0.3 μm), and an outer-shell section around the outside of the center section comprising plate shaped primary particles that are larger than the minute primary particles of the center section (particle size of 0.5 μm).

Battery evaluation was performed for a coin battery having a cathode that was formed using the cathode active material described above, and the initial discharge capacity was 180.1 mAh/g, and the cathode resistance was 4.0Ω.

Comparative Example 3

Except for switching from an air atmosphere to a nitrogen atmosphere and switching the mixed solution in the particle growth process after the start of the particle growth process, the cathode active material for a non-aqueous electrolyte secondary battery was obtained and evaluated in the same way as in Example 1. The compositions of the obtained composite hydroxide and cathode active material were $Ni_{0.82}Co_{0.15}Al_{0.03}Mn_{0.001}(OH)_{2+a}$ ($0 \le a \le 0.5$) and $Li_{1.06}Ni_{0.82}Co_{0.15}Al_{0.03}Mn_{0.001}O_2$, respectively, and in the composite hydroxide, needle shaped minute primary particles could be seen in the center section, however the size of the center section was not sufficient, and the ratio of the space occupied by large plate shaped primary particles was large. Therefore, the obtained cathode active material had a solid structure.

Battery evaluation was performed for a coin battery having a cathode that was formed using the cathode active material described above, and the initial discharge capacity was 204.1 mAh/g, and the cathode resistance was 7.6Ω.

Comparative Example 4

Except for using a solution comprising nickel and cobalt and not including manganese as in the nitrogen atmosphere process for the mixed solution in the nucleation process and the mixed solution until switching from an air atmosphere to a nitrogen atmosphere in the particle growth process, the cathode active material for a non-aqueous electrolyte secondary battery was obtained and evaluated in the same way as in Example 1. The compositions of the obtained composite hydroxide and cathode active material were $Ni_{0.82}Co_{0.15}Al_{0.03}(OH)_{2+a}$ (0≤a≤0.5) and $Li_{1.06}Ni_{0.82}Co_{0.15}Al_{0.03}O_2$, respectively, and in the composite hydroxide, needle shaped minute primary particles could not be seen in the center section and comprised large plate shaped primary particles. Therefore, the obtained cathode active material had a solid structure.

Battery evaluation was performed for a coin battery having a cathode that was formed using the cathode active material described above, and the initial discharge capacity was 206.1 mAh/g, and the cathode resistance was 8.6Ω.

Comparative Example 5

Except for adjusting the mole ratio of the metal elements in the mixed aqueous solution in the nucleation process and in the particle growth process until switching from an air atmosphere to a nitrogen atmosphere so as to be Ni:Co:Mn=80:15:5 (Al=0), the cathode active material for a non-aqueous electrolyte secondary battery was obtained and evaluated in the same way as in Example 1. The compositions of the obtained composite hydroxide and cathode active material were $Ni_{0.82}Co_{0.15}Al_{0.03}Mn_{0.003}(OH)_{2+a}$ (0≤a≤0.5) and $Li_{1.06}Ni_{0.82}Co_{0.15}Al_{0.03}Mn_{0.003}O_2$, respectively, in the composite hydroxide, needle shaped minute primary particles could not be seen in the center section and comprised large plate shaped primary particles. Therefore, the obtained cathode active material had a solid structure.

Battery evaluation was performed for a coin battery having a cathode that was formed using the cathode active material described above, and the initial discharge capacity was 203.2 mAh/g, and the cathode resistance was 8.1Ω.

TABLE 1

(Producing Conditions and Characteristics of Composite Hydroxide)

| | Nucleation Process | | | | | Particle Growth Process | | | | | Reaction Time (hr) | Switching Time (%) | Composite Hydroxide | | |
|---|---|---|---|---|---|---|---|---|---|---|---|---|---|---|---|
| | Oxygen Concentration | | Mixed Aqueous Solution | | | Oxygen Concentration | | Mixed Aqueous Solution | | | | | Average Particle Size (μm) | (d90-d10)/ Average Particle Size | Outer-Shell Section Thickness (%) |
| | % | pH | Ni | Co | Mn | % | pH | Ni | Co | Mn | | | | | |
| Example 1 | 21 | 13 | 1 | 1 | 1 | 0.2 | 11.6 | 82 | 15 | 0 | 4 | 6.25 | 4.8 | 0.49 | 11 |
| Example 2 | 21 | 13 | 1 | 1 | 1 | 0.2 | 11.6 | 82 | 15 | 0 | 4 | 4.2 | 4.4 | 0.49 | 20 |
| Example 3 | 21 | 13 | 1 | 1 | 1 | 0.2 | 11.6 | 82 | 15 | 0 | 4 | 2.1 | 3.9 | 0.49 | 35 |
| Example 4 | 21 | 13 | 1 | 1 | 1 | 0.2 | 11.6 | 82 | 15 | 0 | 4 | 6.25 | 4.9 | 0.48 | 12 |
| Example 5 | 21 | 13 | 1 | 1 | 1 | 0.2 | 11.6 | 82 | 15 | 0 | 4 | 8.3 | 5.2 | 0.48 | 9 |
| Example 6 | 21 | 13 | 1 | 1 | 1 | 0.2 | 11.6 | 82 | 15 | 0 | 8 | 4.2 | 10.1 | 0.50 | 6 |
| Comparative Example 1 | 21 | 13 | 1 | 1 | 1 | 0.2 | 11.6 | 82 | 15 | 0 | 4 | 16.6 | 5.9 | 0.48 | 3.9 |
| Comparative Example 2 | 21 | 13 | 1 | 1 | 8 | 0.2 | 11.6 | 82 | 15 | 0 | 4 | 12.5 | 5.5 | 0.48 | 5.4 |
| Comparative Example 3 | 21 | 13 | 1 | 1 | 1 | 0.2 | 11.6 | 82 | 15 | 0 | 4 | 0 | 4.2 | 0.50 | 47 |
| Comparative Example 4 | 21 | 13 | 82 | 15 | 0 | 0.2 | 11.6 | 82 | 15 | 0 | 4 | 6.25 | 4.1 | 0.50 | Uniform structure |
| Comparative Example 5 | 21 | 13 | 80 | 15 | 5 | 0.2 | 11.6 | 82 | 15 | 0 | 4 | 6.25 | 4.6 | 0.50 | Uniform structure |

TABLE 2

(Producing Conditions and Characteristics of Cathode Active Material)

| | Cathode Active Material | | | | | Secondary Battery | |
|---|---|---|---|---|---|---|---|
| | General Expression | Average Particle Size (μm) | (d90-d10)/ Average Particle Size | Outer-Shell Section Thickness (%) | Specific Surface Area (m²/g) | Initial Discharge Capacity (mAh/g) | Cathode Resistance (Ω) |
| Example 1 | $Li_{1.06}Ni_{0.75}Co_{0.18}Al_{0.03}Mn_{0.02}O_2$ | 4.4 | 0.43 | 12 | 1.3 | 196.5 | 3.8 |
| Example 2 | $Li_{1.06}Ni_{0.80}Co_{0.18}Al_{0.03}Mn_{0.03}O_2$ | 4.3 | 0.43 | 21 | 1.1 | 198.3 | 4.8 |
| Example 3 | $Li_{1.06}Ni_{0.81}Co_{0.35}Al_{0.03}Mn_{0.02}O_2$ | 3.6 | 0.44 | 36 | 0.9 | 201.4 | 5.2 |
| Example 4 | $Li_{1.06}Ni_{0.78}Co_{0.18}Al_{0.03}Mn_{0.03}O_2$ | 4.4 | 0.43 | 12 | 1.3 | 196.0 | 4.0 |
| Example 5 | $Li_{1.06}Ni_{0.78}Co_{0.17}Al_{0.03}Mn_{0.03}O_2$ | 4.8 | 0.43 | 10 | 1.4 | 188.1 | 4.0 |
| Example 6 | $Li_{1.06}Ni_{0.80}Co_{0.58}Al_{0.03}Mn_{0.03}O_2$ | 10.3 | 0.49 | 6 | 0.8 | 185.2 | 4.3 |
| Comparative Example 1 | $Li_{1.06}Ni_{0.78}Co_{0.18}Al_{0.03}Mn_{0.05}O_2$ | — | — | — | — | — | — |
| Comparative Example 2 | $Li_{1.06}Ni_{0.72}Co_{0.18}Al_{0.03}Mn_{0.10}O_2$ | 5.0 | 0.43 | 5.2 | 1.6 | 180.1 | 4.0 |

TABLE 2-continued (Producing Conditions and Characteristics of Cathode Active Material)

| | | Cathode Active Material | | | | Secondary Battery | |
|---|---|---|---|---|---|---|---|
| | General Expression | Average Particle Size (μm) | (d90-d10)/ Average Particle Size | Outer-Shell Section Thickness (%) | Specific Surface Area (m²/g) | Initial Discharge Capacity (mAh/g) | Cathode Resistance (Ω) |
| Comparative Example 3 | $Li_{1.06}Ni_{0.62}Co_{0.15}Al_{0.03}Mn_{0.001}O_2$ | 3.8 | 0.44 | Solid Structure | 0.8 | 204.1 | 7.6 |
| Comparative Example 4 | $Li_{1.06}Ni_{0.82}Co_{0.15}Al_{0.02}O_2$ | 3.7 | 0.43 | Solid Structure | 0.6 | 206.1 | 8.6 |
| Comparative Example 5 | $Li_{1.06}Ni_{0.82}Co_{0.18}Al_{0.03}Mn_{0.003}O_2$ | 3.8 | 0.43 | Solid Structure | 0.7 | 203.2 | 8.1 |

(Evaluation)

The composite hydroxides and cathode active materials of Examples 1 to 6 were produced according to the present invention, so the average particle size and the index value [(d90−d10)/average particle size] that indicates the spread of the particle size distribution are both within the preferred range, and the particles have a uniform and suitable particle size. Moreover, all of the cathode active materials comprise a structure having an outer-shell section in which aggregate primary particles are sintered, and a hollow section on the inside thereof. Coin batteries that use these cathode active materials are batteries having excellent characteristics such as a high initial discharge capacity, excellent cycle characteristic, and low cathode resistance.

In Example 5, switching from an air atmosphere to a nitrogen atmosphere in the particle growth process was a little late, and the time left in an air atmosphere became long, so the ratio of manganese and cobalt became high, and a trend of a slightly lower initial discharge capacity than in Examples 1 to 4 could be seen.

Moreover, in Example 6 the average particle size of the cathode active material was 10.3 μm, which was a little larger than in Examples 1 to 5, and due to this it is considered that the initial discharge capacity decreased a little.

On the other hand, in Comparative Example 1, the time left in the air atmosphere in the particle growth process was too long, so the strength of the composite hydroxide decreased, and damage and sintering of particles occurred in the production process of producing the cathode active material.

In Comparative Example 2, due to the manganese concentration in the mixed aqueous solution in the nucleation process being too high, and the time until switching the mixed aqueous solution in the particle growth process being long, the manganese content in the overall particles became large, and even though the particle structure was good, when compared with the examples, the initial discharge capacity was less.

In Comparative Example 3, switching from an air atmosphere to a nitrogen atmosphere, and switching the mixed solution were performed from the start of the particle growth process, so in the composite hydroxide, a center section having a sufficiently low density was not obtained, and the secondary particles of the finally obtained cathode active material had a solid structure, sufficient specific surface area was not obtained, and the cathode resistance became high.

In Comparative Example 4, a mixed aqueous solution that included manganese was not used in the nucleation process, so even though the time left in an air atmosphere, the low-density center section was small, and after calcination, the secondary particles had a dense solid structure, sufficient specific surface was not obtained, and the cathode resistance became high.

In Comparative Example 5, the manganese content in the mixed aqueous solution that was used in the air atmosphere was low, so even though the time left in the air atmosphere was long, a low-density center section was not generated, and after calcination, the secondary particles had a solid dense structure, sufficient specific surface was not obtained, and the cathode resistance became high.

From the results above, it could be confirmed that by producing nickel composite hydroxide and a cathode active material using the production method of the present invention, a non-aqueous electrolyte secondary battery that uses this cathode active material becomes a battery having excellent characteristics such as a high initial discharge capacity, excellent cycling characteristic and low cathode resistance.

INDUSTRIAL APPLICABILITY

The production method for producing the cathode active material of the present invention and the composite hydroxide, which is the precursor of that cathode active material are both simple, and suitable for large-scale production, so the industrial effect of the present invention is extremely large.

Moreover, the non-aqueous electrolyte secondary battery of the present invention is suitable as the power source for compact electronic devices (notebook personal computers, portable telephone terminals, and the like) that always require a high capacity, and is also suitable as an electric automobile battery that requires high output. Furthermore, the non-aqueous electrolyte secondary battery of the present invention has excellent safety, is compact and has high output, so is also suitable as the power source for transport equipment having a restricted installation space.

EXPLANATION OF REFERENCE NUMBERS

1 Coin battery
2 Case
2a Cathode can
2b Anode can
2c Gasket
3 Electrode
3a Cathode
3b Anode
3c Separator

What is claimed is:

1. A production method for producing by a crystallization reaction nickel composite hydroxide that is expressed by a general formula (1): $Ni_xCo_yAl_zMn_tM_s(OH)_{2+a}$ (x+y+z+t+ s=1, 0≤y≤0.3, 0<z≤0.1, 0.001<t≤0.05, 0≤s≤0.05, 0≤a≤0.5, and M is at least one additional element that is selected from the group comprising Mg, Ca, Ti, V, Cr, Zr, Nb, Mo and W), comprising:

a nucleation process controlling a nucleation aqueous solution that includes a metal compound that includes metal elements at a composition ratio that is expressed by a general formula (a): $Ni_xCo_yAl_zMn_tM_s$ (x+y+z+t+s=1, 0≤y≤0.8, 0≤z≤0.1, 0.1≤t≤0.8, 0≤s≤0.05, and M is at least one additional element that is selected from the group comprising Mg, Ca, Ti, V, Cr, Zr, Nb, Mo and W) and an ammonium ion donor so that the pH value at a reference liquid temperature of 25° C. becomes 12.0 to 14.0, and performing nucleation with supplying the metal compound and the ammonium ion donor in an oxidizing atmosphere having an oxygen concentration greater than 1% by volume; and a particle growth process of controlling a particle growth aqueous solution that includes nuclei that were formed in the nucleation process so that the pH value at a reference liquid temperature of 25° C. becomes 10.5 to 12.0, and growing the nuclei with supplying the metal compound and the ammonium ion donor, and, at a time from the start of the particle growth process within a range of 1% to 15% of the total time from the start to end of the particle growth process, switching from the oxidizing atmosphere to a mixed atmosphere of oxygen and inert gas having an oxygen concentration of 1% by volume or less and replacing the supplied metal compound with a metal compound that includes metal elements at a composition ratio that is expressed by a general formula (b): $Ni_xCo_yAl_zMn_tM_s$ (x+y+z+t+s=1, 0≤y≤0.3, 0≤z≤0.1, 0≤t<0.05, 0≤s≤0.05, and M is at least one additional element that is selected from the group comprising Mg, Ca, Ti, V, Cr, Zr, Nb, Mo and W), and continuing to grow the nuclei with supplying the metal compound and the ammonium ion donor;

and further comprising a process of coating an aluminum compound on the nickel composite hydroxide that is obtained in the particle growth process, at least in case that aluminum is not included in any of the metal compound that is included in the nucleation aqueous solution and the metal compound that is supplied in the particle growth process.

2. The production method for producing nickel composite hydroxide according to claim 1, wherein the oxygen concentration of the oxidizing atmosphere is 10% by volume or greater.

3. The production method for producing nickel composite hydroxide according to claim 1, wherein switching the atmosphere and the supplied metal compound in the particle growth process is performed in the range of 2% to 12.5% from the start of the particle growth process.

4. The production method for producing nickel composite hydroxide according to claim 1, wherein an aqueous solution that is formed by adjusting the pH value of the nucleation aqueous solution after the nucleation process has ended is used as the particle growth aqueous solution.

5. The production method for producing nickel composite hydroxide according to claim 1, wherein the oxygen concentration of the mixed atmosphere is 0.5% by volume or less.

6. The production method for producing nickel composite hydroxide according to claim 1, wherein, in the particle growth process, part of the liquid component of the particle growth aqueous solution is removed.

7. The production method for producing nickel composite hydroxide according to claim 1, wherein, in the nucleation process and in the particle growth process, the ammonia concentration of the nucleation aqueous solution and the particle growth aqueous solution is maintained within the range of 3 g/L to 25 g/L.

8. The production method for producing nickel composite hydroxide according to claim 1, further comprising a process of coating a compound of the one kind of additional element or more on the nickel composite hydroxide that was obtained in the particle growth process.

9. A nickel composite hydroxide that is expressed by a general formula (1): $Ni_xCo_yAl_zMn_tM_s(OH)_{2+a}$ (x+y+z+t+s=1, 0≤y≤0.3, 0<z≤0.1, 0.001<t≤0.05, 0≤s≤0.05, 0≤a≤0.5, and M is at least one additional element that is selected from the group comprising Mg, Ca, Ti, V, Cr, Zr, Nb, Mo and W), comprising spherical shaped secondary particles that are formed by an aggregation of plural primary particles, with the secondary particles having an average particle size of 3 μm to 15 μm, and an index value [(d90−d10/average particle size] that indicates the spread of the particle size distribution of 0.55 or less;

the secondary particles comprising:

a center section comprising minute primary particles of a composite hydroxide that is expressed by a general formula (2): $Ni_xCo_yAl_zMn_tM_s(OH)_{2+a}$ (x+y+z+t+s=1, 0≤y≤0.8, 0≤z≤0.1, 0.1≤t≤0.8, 0≤s≤0.05, 0≤a≤0.5, and M is at least one additional element that is selected from the group comprising Mg, Ca, Ti, V, Cr, Zr, Nb, Mo and W); and an outer-shell section comprising plate shaped primary particles that are larger than the minute primary particles and that exists on the outside of the center section, and are constructed by composite hydroxide that is expressed by a general formula (3): $Ni_xCo_yAl_zMn_tM_s(OH)_{2+a}$ (x+y+z+t+s=1, 0≤y≤0.3, 0≤z≤0.1, 0≤t<0.05, 0≤s≤0.05, 0≤a≤0.5, and M is at least one additional element that is selected from the group comprising Mg, Ca, Ti, V, Cr, Zr, Nb, Mo and W); and aluminum existing in at least one of the center section and the outer-shell section, or existing as an aluminum compound on the surface of the secondary particles, the minute primary particles having an average particle size of 0.01 μm to 0.3 μm, and the plate shaped primary particles having an average particle size of 0.3 μm to 3 μm, and the ratio of the thickness of the outer-shell section with respect to the particle size of the secondary particles being 5% to 45%.

10. The nickel composite hydroxide according to claim 9, wherein the aluminum is uniformly distributed inside the secondary particles and/or the aluminum compound uniformly coats the surface of the secondary particles.

11. The nickel composite hydroxide according to claim 9, wherein the one kind of additional element or more is uniformly distributed inside the secondary particles and/or compound of the one kind of additional element or more uniformly coats the surface of the secondary particles.

12. A production method for producing a cathode active material for a non-aqueous electrolyte secondary battery comprising a lithium nickel composite oxide having a layered hexagonal crystal structure that comprises spherical shaped secondary particles that are formed from an aggregation of plural primary particles and expressed by a general formula (4): $Li_{1+u}Ni_xCo_yAl_zMn_tM_sO_2$ (where, −0.05≤u≤0.20, x+y+z+t+s=1, 0≤y≤0.3, 0<z≤0.1, 0.01<t≤0.05, 0≤s≤0.05, and M is selected from at least one kind of additional element that is selected from the group of Mg, Ca, Ti, V, Cr, Zr, Nb, Mo and W), comprising:

a heat treatment process of heating the nickel composite hydroxide of claim 9 at a temperature of 105° C. to 750° C.;

a mixing process of mixing a lithium compound into the heat treated nickel composite hydroxide or a nickel composite oxide obtained by the heat treatment process to form a lithium mixture; and a calcination process of performing calcination of the lithium mixture obtained by the mixing process at a temperature of 700° C. to 800° C. in an oxidizing atmosphere.

13. The production method for producing a cathode active material for a non-aqueous electrolyte secondary battery according to claim 12, wherein the lithium mixture is adjusted so that the ratio between the sum of the number of atoms of metals other than lithium included in the lithium mixture and the number of atoms of lithium is 1:0.95 to 1.2.

14. The production method for producing a cathode active material for a non-aqueous electrolyte secondary battery according to claim 12, wherein, in the calcination process, pre-calcination is performed before calcination at a temperature of 350° C. to 800° C.

15. The production method for producing a cathode active material for a non-aqueous electrolyte secondary battery according to claim 12, wherein the oxidizing atmosphere in the calcination process is an atmosphere having an oxygen concentration of 18% to 100% by volume.

16. A cathode active material for a non-aqueous electrolyte secondary battery comprising a lithium nickel composite oxide having a layered hexagonal crystal structure that comprises spherical shaped secondary particles that are formed from an aggregation of plural primary particles and expressed by a general formula (4): $Li_{1+u}Ni_xCo_yAl_zMn_tM_sO_2$ (where, $0.05 \leq u \leq 0.20$, $x+y+z+t+s=1$, $0 \leq y \leq 0.3$, $0 < z \leq 0.1$, $0.01 < t \leq 0.05$, $0 \leq s \leq 0.05$, and M is selected from at least one kind of additional element that is selected from the group of Mg, Ca, Ti, V, Cr, Zr, Nb, Mo and W), wherein the average particle size is 2 μm to 15 μm, the index value [(d90−sd10)/average particle size] that indicates the spread of particle size distribution is 0.6 or less, and has a hollow structure comprising an outer-shell section in which an aggregation of primary particles are sintered, and a hollow section that exists inside the outer-shell section, and the ratio of thickness of the outer-shell section with respect to the particle size of the secondary particles is 5% to 35%.

17. A non-aqueous electrolyte secondary battery comprising a cathode that is formed using the cathode active material for a non-aqueous electrolyte secondary battery according to claim 16.

* * * * *